US 11,148,606 B2

(12) United States Patent
Andersson et al.

(10) Patent No.: US 11,148,606 B2
(45) Date of Patent: Oct. 19, 2021

(54) LOAD CARRIER FOOT

(71) Applicant: THULE SWEDEN AB, Hillerstorp (SE)

(72) Inventors: Stefan Andersson, Värnamo (SE);
Fredrik Larsson, Vaggeryd (SE)

(73) Assignee: Thule Sweden AB, Hillerstorp (SE)

( * ) Notice: Subject to any disclaimer, the term of this patent is extended or adjusted under 35 U.S.C. 154(b) by 0 days.

(21) Appl. No.: 16/954,360

(22) PCT Filed: Dec. 18, 2018

(86) PCT No.: PCT/EP2018/085449
§ 371 (c)(1),
(2) Date: Jun. 16, 2020

(87) PCT Pub. No.: WO2019/121651
PCT Pub. Date: Jun. 27, 2019

(65) Prior Publication Data
US 2020/0377033 A1    Dec. 3, 2020

(30) Foreign Application Priority Data

Dec. 19, 2017 (EP) ..................................... 17208327
Sep. 10, 2018 (DE) .......................... 202018105171.7

(51) Int. Cl.
*B60R 9/058*    (2006.01)
(52) U.S. Cl.
CPC ..................................... *B60R 9/058* (2013.01)
(58) Field of Classification Search
CPC . B60R 9/058; B60R 9/052; B60R 2011/0059; B60R 2011/0084
USPC ................................................ 224/329, 331
See application file for complete search history.

(56) References Cited

U.S. PATENT DOCUMENTS

| 3,858,774 | A  | * | 1/1975  | Friis    | B60R 11/00 224/325 |
| 6,641,012 | B1 | * | 11/2003 | Lundgren | B60R 9/058 224/331 |
| 8,534,518 | B2 | * | 9/2013  | Shen     | B60R 9/045 224/329 |

FOREIGN PATENT DOCUMENTS

| DE | 2812085 A1    | * | 10/1978 | ............ B60R 9/058 |
| DE | 19740820 A1   | * | 4/1998  | ............ B60R 9/058 |
| DE | 102013000460 B3 |  | 2/2014  |                         |
| EP | 2905179 A1    |   | 8/2015  |                         |
| GB | 927818        |   | 6/1963  |                         |

OTHER PUBLICATIONS

International Search Report and Written Opinion of the International Searching Authority for International Application No. PCT/EP2018/085449, European Patent Office (EPO), dated Jan. 25, 2019, 16 pages.

* cited by examiner

*Primary Examiner* — Scott T McNurlen
(74) *Attorney, Agent, or Firm* — Sterne, Kessler, Goldstein & Fox P.L.L.C.

(57) ABSTRACT

Disclosed are a load carrier foot for supporting a load bar on a vehicle, a load carrier bracket for coupling a load carrier foot to a vehicle and a load carrier comprising such a load carrier foot and a load carrier bracket. The load carrier foot comprises a holder adapted to receive the load carrier bracket. The holder comprises a sleeve portion defining an accommodating space which is configured to partially accommodate the load carrier bracket.

17 Claims, 17 Drawing Sheets

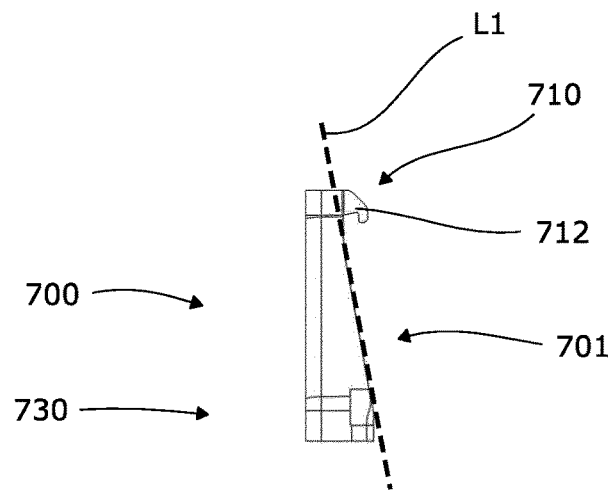
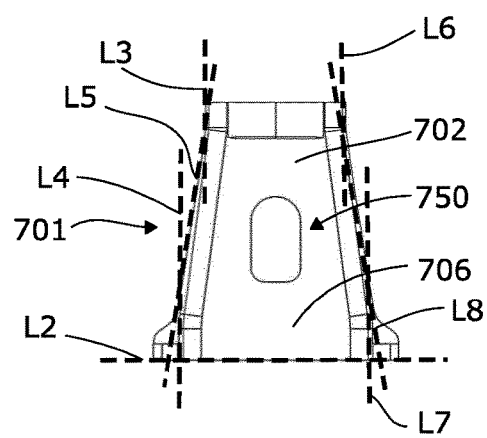
FIG.15      FIG.16
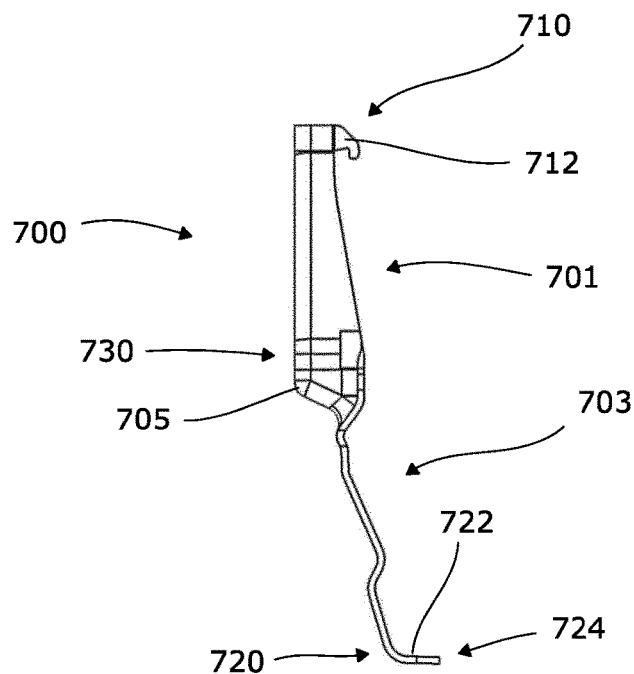
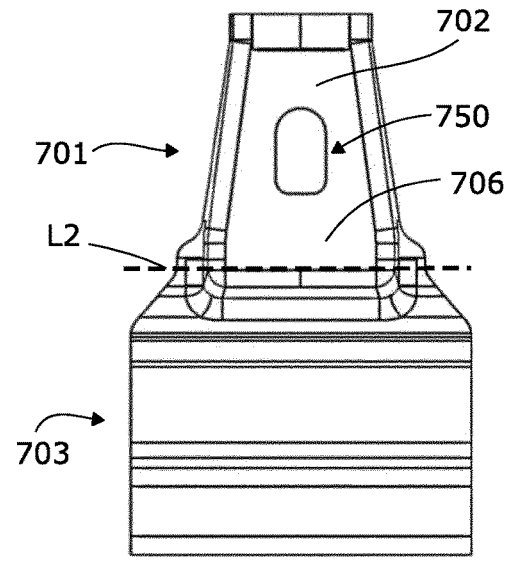
FIG.17      FIG.18

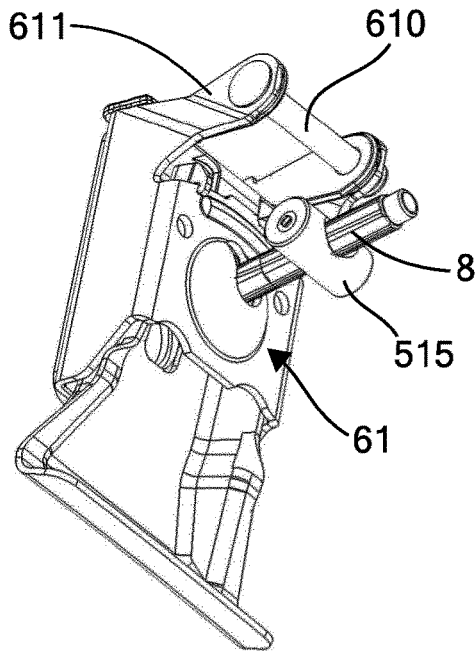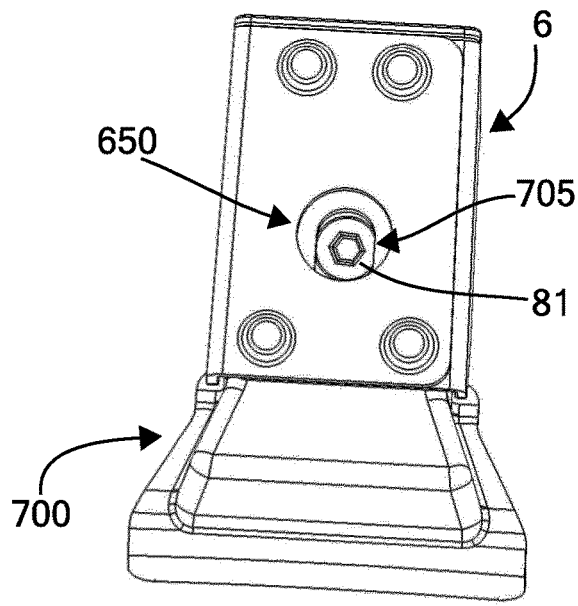
FIG.29  FIG.30
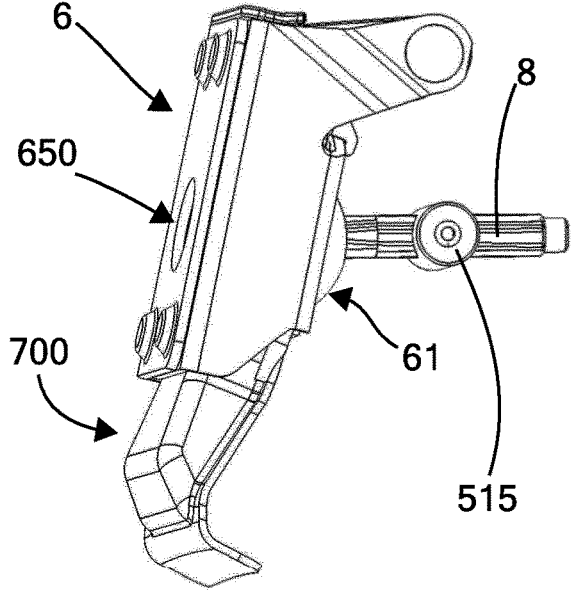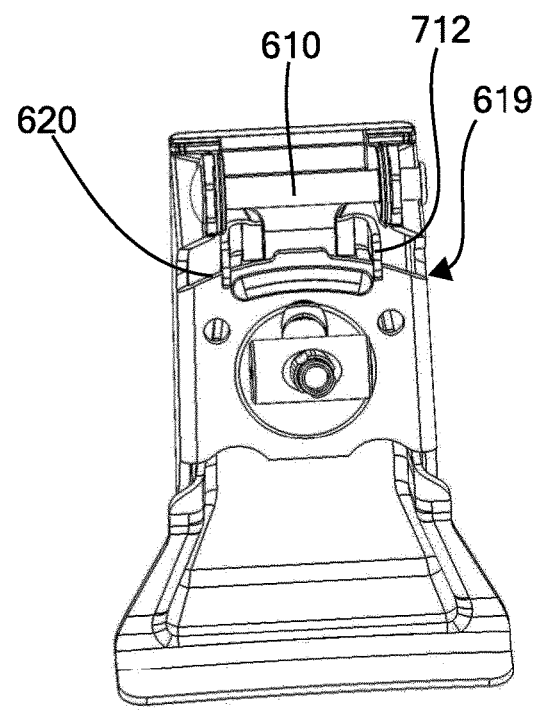
FIG.31  FIG.32

LOAD CARRIER FOOT

FIELD OF THE INVENTION

The present invention relates to a load carrier foot for supporting a load bar on a vehicle, a load carrier bracket for coupling a load carrier foot to a vehicle and to a load carrier comprising a load carrier foot and a load carrier bracket.

BACKGROUND

Load carrier feet are an essential part of many load carrier systems. In particular, load carrier feet are an inherent component of load carrier systems in which a load bar is fixed to the roof of a vehicle.

There exist load carrier feet which are specifically designed to be used on vehicles which do not comprise a roof railing for fixing a load carrier foot. Such load carrier feet are typically coupled to the vehicle by means of a fixation bracket which is able to grab a portion of the car body. Each load carrier foot comprises a mechanism for tightening the fixation bracket to thereby clamp the load carrier foot to the vehicle roof. It is also known that the dimensions of vehicles vary and that, therefore, the load carrier systems need to be adapted to the different vehicle dimensions.

A known issue is that the position of load carrier feet on a vehicle roof vary from vehicle to vehicle. In order to address this issue, it is known to use load carrier feet which can be used with different load carrier brackets. In this way, it is possible to manufacture load carrier brackets for different vehicle types while most components of the load carrier foot can remain unchanged. The load carrier brackets need to be able to transfer high forces and need to be securely coupled to the load carrier foot. Coupling the load carrier brackets with known load carrier feet is, however, often cumbersome. The load carrier foot needs to be able to transfer high forces on the load carrier bracket.

SUMMARY

It is the object to provide an enhanced load carrier foot and an enhanced load carrier bracket.

The object is solved by a load carrier foot according to independent claim 1, a load carrier bracket according to claim 11 and/or according to the following summary. Advantageous further formations are subject of the dependent claims wherein specific further modifications can be gleaned from the following summary.

According to a first aspect, a load carrier foot for supporting a load bar on a vehicle is provided. The load carrier foot comprises a holder adapted to receive a load carrier bracket for coupling the load carrier foot to the vehicle. The holder comprises a sleeve portion defining an accommodating space which is configured to partially accommodate the load carrier bracket.

The sleeve portion creates a 3D structure that better withstands forces acting on the system. Since the holder comprises a sleeve portion, the overall strength of the bracket is enhanced. Thus, the holder is able to withstand higher forces. Therefore, the holder can be used for transferring higher forces on other elements like the load carrier bracket. In this way, it is possible to transfer all forces necessary for tightening the load carrier bracket via the holder.

The sleeve portion can comprise a box-like shape and can comprise an outer wall, an inner wall and two side walls.

Preferably, at least the sleeve portion is integrally formed by bending a metal sheet and preferably comprises an overlap section at which two joining sections of the bent metal sheet are overlapped. The overlap section can be quadrangular or trapezoidal shaped.

By integrally forming the sleeve portion and/or providing an overlapping section, the strength of the holder is further increased.

Preferably, the joining sections are joined by material forming, preferably by clinching or torxing, at least two joining portions.

By joining the joining sections through material forming at least two joining portions, the strength of the holder can be increased without using additional components.

Preferably, the sleeve portion is formed such that the accommodating space is tapered in the longitudinal direction towards an upper portion of the holder. In other words, the sleeve portion can be formed in a funnel-shape comprising a wide lower end and a narrow upper end.

Such a configuration has the benefit that an insertion of the load carrier bracket is simplified because a wider portion is available on the insertion side of the sleeve portion. Furthermore, such a configuration provides room for a pivoting movement of the load carrier bracket.

Preferably, the overlap section defines an outer wall of the sleeve portion. The sleeve portion can further comprise an inner wall and two side walls. At least the side walls can be inclined with respect to the longitudinal direction in order to form the tapered accommodating space.

In this way, the outer wall of the sleeve portion comprises a higher strength compared to other walls of the sleeve portion which additionally qualifies the outer wall for a force transfer on the load carrier bracket.

Preferably, the sleeve portion comprises a coupling portion formed in the inner wall. The coupling portion can be formed as an accommodating recess configured to support a tightening member for applying a pushing force on the coupling portion. The accommodating recess can comprise a supporting surface. The supporting surface can be a curved surface. Furthermore, the accommodating recess can comprise an opening for passing a portion of the tightening member through the inner wall.

By providing a coupling portion on the inner wall of the sleeve portion, it is possible to apply a force on the inner wall of the sleeve portion for urging the sleeve portion, and thus the holder, in a tightening direction. With such a configuration, a tightening force received from the tightening member is directly applied on the sleeve portion and not on the load carrier bracket. In other words, a tightening force can be applied on the load carrier bracket only by means of the holder. Since the tightening member is not directly supported on the load carrier bracket, the bracket does not have to comprise a specifically formed supporting section or seat section allowing to properly support the tightening member.

The supporting surface can be configured to directly support the tightening member. It is also possible to indirectly support the tightening member on the supporting surface using an intermediate member.

Preferably, the sleeve portion has an upper edge portion at least partially defining an upper opening of the sleeve portion. The upper edge portion can be configured for an engagement with the load carrier bracket.

By providing an upper edge portion for an engagement with the load carrier bracket a simple and reliable engagement means is provided.

Preferably, the upper edge portion is convexly formed.

Convexly forming the upper edge portion allows a load carrier bracket hooked thereon to move along the upper edge portion during a tightening process. Furthermore, in case the load carrier bracket is oriented slightly obliquely in the sleeve portion a tightening force can be securely transferred on the load carrier bracket via the upper edge portion.

Preferably, the load carrier foot further comprises an urging member configured to apply a pushing force on an engaging section of the load carrier bracket towards the upper edge portion. The urging member can be a spring element. The urging member can be arranged in the accommodating space.

The presence of the urging member leads to a configuration in which the load carrier bracket automatically snaps on the upper edge portion so that the load carrier bracket is securely hooked on the upper edge portion. Furthermore, the urging member acts as a securing device in that the load carrier bracket remains securely hooked on the upper edge portion unless a user applies a force on the load carrier bracket moving the same against the urging force of the urging member. In the state wherein no bracket is inserted in the accommodating space, the urging member can be unloaded or can already be pretensioned.

Preferably, the bracket holder comprises a lower edge portion at least partially defining a lower opening of the sleeve portion. The lower edge portion is configured to contact the load carrier bracket and to transfer a pushing force on the load carrier bracket.

Due to the sleeve shape of the holder higher forces can be transferred via the lower edge portion of the holder.

The load carrier foot can be specifically designed for supporting the load bar. The load carrier foot can comprise a support member which can be a rear cover of the load carrier foot, i.e. a cover which is arranged on the vehicle side or which is facing towards the vehicle center when the load carrier foot is mounted on the vehicle. The load carrier foot can comprise a foot pad for contacting the vehicle roof and for transferring a load onto the vehicle roof. The support member, e.g. the rear cover, can be movably, e.g. rotatably, supported on the foot pad. More precisely, a lower portion of the support member can be specifically designed to be supported on an upper side of the foot pad. Furthermore, the support member can be configured to support the load bar thereon. In other words, the upper portion of the support member can be configured to support a load bar thereon. Thus, the support member or rear cover is able to transfer a load received from a load bar onto the foot pad. In this way, a major part of a normal force applied on the load carrier foot by the load bar is directly transferred to the foot pad by means of the support member. The configuration can be such that the foot pad only receives forces from the support member, e.g. the rear cover.

According to a further aspect, a load carrier bracket for coupling a load carrier foot to a vehicle is provided. The load carrier bracket comprises a vehicle engaging section and a trough-shaped coupling portion. The trough-shaped coupling portion extends from the vehicle engaging section in longitudinal direction of the load carrier bracket and comprises a holder engaging portion engageable with a holder of a load carrier foot.

By three-dimensionally forming the load carrier bracket in the above described way, the rigidity and strength of the load carrier bracket is increased.

Preferably, the trough-shaped coupling portion is funnel-shaped with the holder engaging portion being formed at a narrow end. In addition or alternatively, the trough-shaped coupling portion is continuously convexly formed in its longitudinal direction and comprises an outer surface adapted to receive a force from the holder of the load carrier foot.

By providing a continuously convex formed trough-shaped coupling portion, it is possible to apply higher forces on the outer side of the coupling portion, for example by means of a lower edge of the above mentioned holder.

Preferably, the trough-shaped coupling portion extends substantially over the entire length of the bracket. In addition or alternatively, the trough-shaped coupling portion at least partially comprises a box-like shape. For example, the trough-shaped coupling portion can comprise two side walls and a bottom wall which is arranged substantially perpendicular to the side walls.

With the latter configuration, the rigidity and strength of the load carrier bracket is even more enhanced.

Preferably, the holder engaging section is configured such that the load carrier bracket can be hooked on the holder. The holder engaging section can comprise two hooks.

According to a further aspect, a load carrier comprising a load carrier foot as described before and a load carrier bracket as described before is disclosed. The load carrier bracket can be partially accommodated in the accommodating space and releasably engaged with the holder. The load carrier foot can further comprise a tightening member having a tightening member operating portion arranged in the accommodating space between an inner wall of the holder and the load carrier bracket. The holder and the load carrier bracket can comprise access openings configured to provide tool access to the tightening member operating portion.

The load carrier can comprise a load bar which is coupled to the load carrier foot. The load carrier foot can comprise the above described holder. Furthermore, the above described load carrier bracket can be inserted in the holder. The load carrier foot can comprise a foot pad which is brought in contact with the roof of a vehicle when the load carrier is mounted. The holder can be operatively coupled with a tightening mechanism of the load carrier foot. The tightening mechanism can be operated by the tightening member. The tightening mechanism can be configured to effect a movement of the holder and to operate a locking mechanism for securely locking the load bar to the load carrier foot when the tightening member is operated.

The locking mechanism can be configured to clamp the load bar on a supporting portion of the load carrier foot, which can be a portion of the rear cover. The supporting portion can be an integral part of the rear cover of the load carrier foot. The rear cover can also be referred to as support member for supporting the load bar thereon. The supporting portion can comprise a supporting surface formed in the rear cover. Accordingly, the rear cover can acts as a support for supporting the load bar. In other words, the load bar can be supported on an upper portion of the rear cover. The rear cover can be supported on the foot pad. More precisely, the rear cover can comprise a coupling portion which is engaged with the foot pad. The foot pad can be adapted to contact the vehicle roof and for transferring a load onto the vehicle roof. The rear cover can be movably, e.g. rotatably, supported on the foot pad. More precisely, a lower portion of the rear cover can be specifically designed to be supported on an upper side of the foot pad. Thus, the rear cover can be able to transfer a load received from a load bar onto the foot pad. In this way, a major part of a normal force applied on the load carrier foot by a load carried on the load bar is directly transferred to the foot pad by means of the rear cover. The configuration can be such that the foot pad only receives forces from the rear cover.

Furthermore, the present invention relates to a roof rack foot with an adjustment arrangement. The roof rack foot may be a load carrier foot according any of the above described embodiments. A profile element of a roof rack, for example a cross bar, may be attached to a vehicle via the roof rack foot. For example, the profile element of the roof rack may be attached to the roof of the vehicle or to a loading area of the vehicle. The roof rack foot may comprise a first and a second clamping portion, which may be adjusted relatively to each other via the adjustment arrangement to clamp a roof rail or any other element connected to the roof of a vehicle therebetween. A clamping force generated by the clamping portions may be adjusted by adjusting the adjustment arrangement. The adjustment arrangement comprises a bolt with an external thread. The external thread may be formed along a section of the bolt or along the entire bolt length. Further, in circumferential direction of the bolt, the external thread may be formed along only a section or along the entire bolt circumference. The external thread may be any type of thread, for example a right-hand or left-hand thread and/or a metric and/or any other type of thread, which may be formed as a trapezoidal and/or flat thread.

In addition, the adjustment arrangement of the roof rack foot comprises a barrel nut, which is preferably formed as a cylindrical nut, i.e. as a nut with a circular cross-section. The barrel nut comprises a barrel axis, which preferably represents an axis of symmetry. Besides the circular cross-section, it is also conceivable that the barrel nut comprises a polygonal and/or any other type of cross-section. The barrel nut comprises a threaded through hole, which is angled with respect to the barrel axis, preferably perpendicular to the barrel axis. The threaded through hole may be formed centrally in the barrel nut along the barrel axis. The threaded through hole may extend completely through the barrel nut and preferably intersects the barrel axis of the barrel nut. The internal thread of the threaded through hole may have an arbitrary configuration but is adapted to the external thread of the bolt. Specifically, the bolt and the barrel nut are matched to each other such that the barrel nut may be screwed onto the external thread of the bolt via the threaded through hole. By screwing the bolt into the barrel nut, the bolt and the barrel nut may be adjusted relative to each other translatory.

In addition, the adjustment arrangement of the roof rack foot of the present invention comprises a locking mechanism for preventing loosening of a screw connection between the bolt and the barrel nut. The locking mechanism may be configured to prevent such a loosening completely or merely to weaken it or slow it down.

The present invention provides a roof rack foot with high reliability. Via the locking mechanism, loosening of a clamping arrangement, which is used for clamping of the roof rack foot to the vehicle roof, may be prevented. In particular, this is also possible with vibrations, to which a roof rack foot is frequently exposed during intended operation thereof.

According to one embodiment, the locking mechanism comprises a bore in the barrel nut running into the threaded through hole. The bore directly abuts on the threaded through hole such that a spatial connection is formed between the bore and the threaded through hole. In particular, the bore extends along the barrel axis. According to one embodiment, the bore extends perpendicular to the threaded through hole. A locking element for preventing loosening of the screw connection is movably provided in the bore. The locking element may be biased via a spring element towards the threaded through hole. With the roof rack foot of this embodiment, no additional components are required to provide a safety mechanism, but the locking mechanism is provided by adapting existing components. This reduces the total number of parts of the roof rack foot. Furthermore, the locking mechanism of the present invention is subjected to low wear, as no materials susceptible to wear, such as plastic or the like, are used.

According to another embodiment, the bore is narrowed by clinching at the end facing away from the threaded through hole for preventing the locking element and/or spring from escaping from the bore. By means of the clinching, the diameter of the bore can only be reduced or completely closed. By means of the clinching, the locking element can be integrated into the barrel nut in a particularly simple and cost-effective manner. The clinching allows for easy manufacturing of the adjustment arrangement of the roof rack foot.

According one embodiment, the locking element is formed as a ball. However, other designs of the locking element are also conceivable in this regard. In this embodiment, the bore may have a narrowing portion, wherein the diameter of the bore decreases linearly along the bore axis, for example. Here, however, a step-like narrowing and/or a continuous non-linear narrowing are also conceivable. For example, the narrowing portion may have a conical shape. In particular, the narrowing portion comprises a shape adapted to the locking element. If, for example, the locking element is a ball, the narrowing portion may comprise a narrowing portion in the form of a circular segment adapted to the cross-section of the ball. In this embodiment, the narrowing portion is formed adjacent, preferably directly adjacent the threaded through hole. The narrowing portion is designed in such a way that it can prevent the ball from escaping from the bore, at the same time allowing the ball to penetrate spatially into the threaded through hole. Thus, a locking mechanism for preventing loosening of the screw connection described above may be provided in a particularly simple, reliable and cost-effective manner.

According to one embodiment, the locking mechanism comprises a depression formed in the bolt. The depression may be groove or notch. However, any other type of depression is conceivable in this regard, e.g. a slot and/or a circle-shaped recess. In particular, the depression is a groove that extends along the axis of the bolt. The groove may be formed along the entire length of the bolt or along a portion of the bolt. Preferably, the bolt comprises two or three such grooves in the circumferential direction, which may be equidistantly spaced in the circumferential direction. The locking mechanism may be configured in this embodiment for preventing loosening of the screw connection by engagement of the locking element with the depression. In this way, a form-fit locking of the screw connection described above can be achieved with low wear.

The present invention also relates to a roof rack with a roof rack foot according to one of the embodiments described above. Regarding the understanding and advantages of the individual features, reference is made to the above explanations in connection with the roof rack foot.

In a further aspect, the present invention relates to a method of manufacturing a bolt with an external thread, which is preferably suitable for being used with an adjustment arrangement of a roof rack foot according to one of the embodiments described above. The method comprises pressing a groove, which preferably extends in the direction of the bolt axis, into the lateral face of the bolt. Preferably, the method comprises pressing two or three grooves into the lateral face, which are spaced equidistantly in circumferential direction. Furthermore, the method comprises cutting of an external thread into the lateral face of the bolt. Preferably, cutting of the thread takes place after pressing of the groove. Regarding the understanding and advantages of the individual features, reference is made to the above explanations in connection with the roof rack foot.

In a further aspect, the present invention relates to a method of manufacturing a barrel nut, which is preferably suitable for being used with an adjustment arrangement of a roof rack foot according to one of the embodiments described above. The method comprises forming a bore in the barrel nut. The barrel nut may further comprise a threaded through hole, wherein the bore may be formed in such a way that it extends into the threaded through hole, e.g. to create a spatial connection therewith. The bore may be configured according to the above embodiments. In addition, the method comprises positioning of a locking element for prevent loosening of a screw connection between the barrel nut and a threaded bolt in the bore. Preferably, a ball and/or a spring for biasing the ball is positioned in the bore. However, other locking elements may also be provided in this regard, as described above. In addition, the method comprises narrowing the diameter of the bore at an end by clinching for preventing escape of the locking element from the bore. As described above, the diameter of the bore may be reduced or completely closed. Preferably, the step of narrowing the diameter takes place after forming of the bore and after positioning the locking element in the bore. Regarding the understanding of the individual features and their advantages, reference is made to the explanations above in connection with the roof rack foot.

BRIEF DESCRIPTION OF THE DRAWINGS

FIG. 15 shows a side view of the upper part of the load carrier bracket according to an embodiment.
FIG. 16 shows a front view of the load carrier bracket of FIG. 15.
FIG. 17 shows a side view of a load carrier bracket according to an embodiment.
FIG. 18 shows a front view of the load carrier bracket of FIG. 17.
FIGS. 29 to 32 show perspective views of an assembly comprising a load carrier bracket and a holder.

DETAILED DESCRIPTION OF EMBODIMENTS

Figure 1:
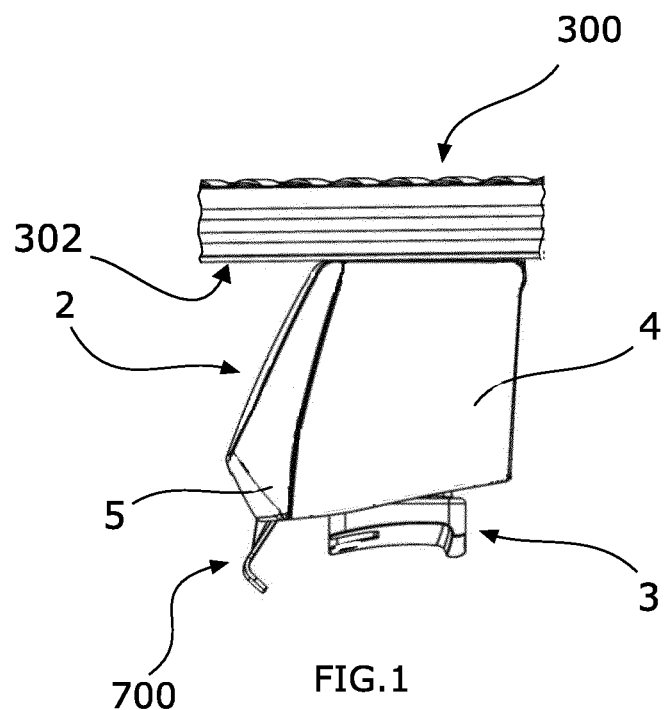
FIG. 1 shows a side view of a load carrier foot according to an embodiment.

In the following, embodiments will be described with reference to the drawings. It is to be noted that similar elements in the drawings are denoted with the same reference signs.

FIG. 1 shows a side view of an assembly comprising a load carrier foot 2 according to an embodiment. A load bar 300 is supported on an upper portion of the load carrier foot 2.

More precisely, an outer surface 302 of the load bar 300 is supported on the upper portion of the load carrier foot 2. Furthermore, a load carrier bracket 700 is inserted into and fixedly held in the load carrier foot 2. The load carrier foot 2 further comprises a foot pad 3. The foot pad 3 is configured to be supported on the roof of a vehicle. As is further shown in FIG. 1, the load carrier foot 2 comprises a front cover 5 and a rear cover 4 which cover an interior mechanism of the load carrier foot 2.

Figure 2:
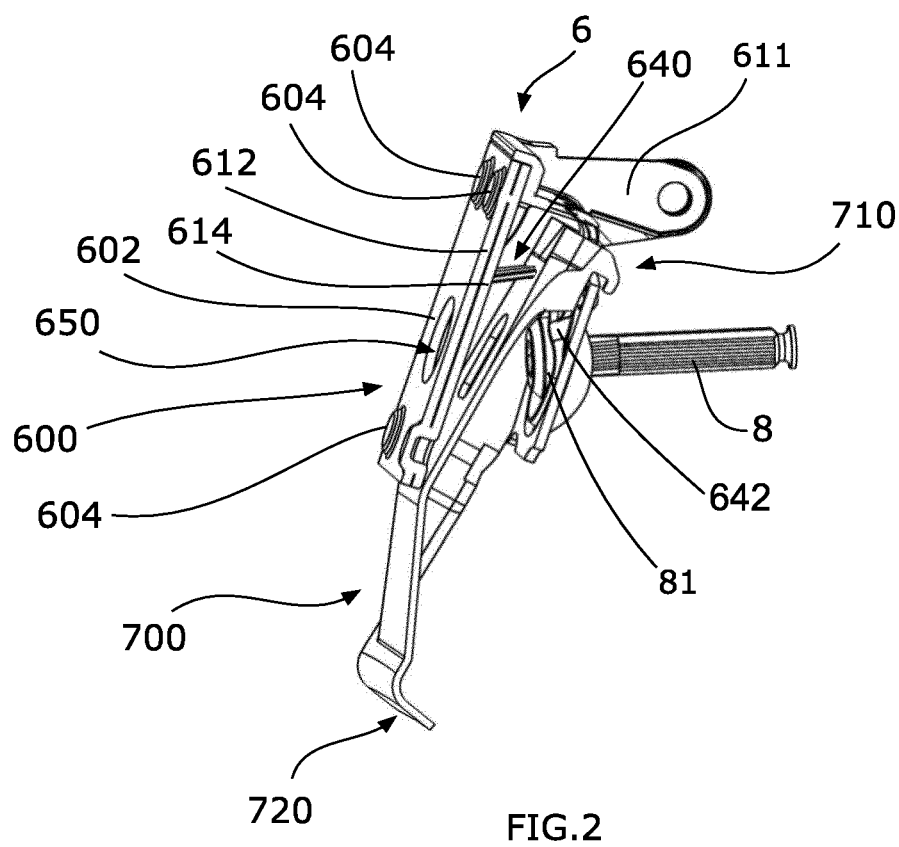
FIG. 2 shows a perspective and sectional view of an assembly of the load carrier foot.

FIG. 2 shows an assembly comprising a holder 6, a load carrier bracket 700 inserted into and coupled with the holder 6, an urging member 640 for exerting a pushing force on the load carrier bracket 700, and a tightening member 8 force transmittingly coupled to the holder 6 at an operating portion 81 thereof.

Figure 7:
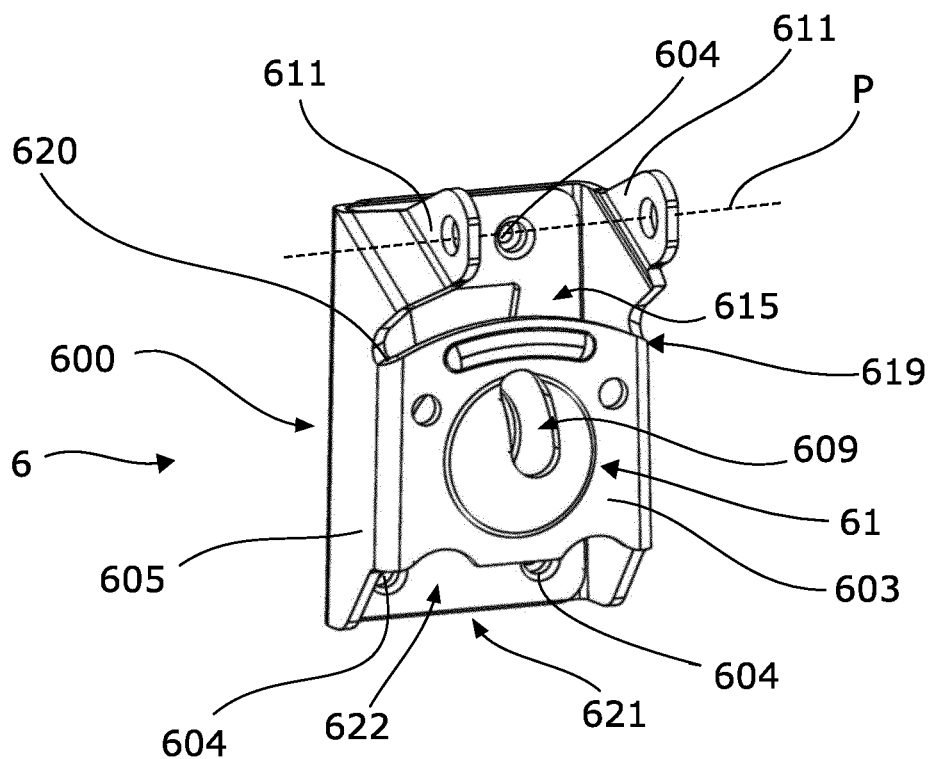
FIG. 7 shows a perspective rear view of the holder of FIG. 3.

The configuration of the holder 6 will be further described with reference to FIGS. 3, 4 and 7. The holder 6 comprises a sleeve portion 600 which is formed in a lower portion 67 of the holder 6. The sleeve portion 600 comprises a box-like shape and comprises an outer wall 602, an inner wall 603 and two side walls 605 connecting the inner wall 603 with the outer wall 602.

Figure 9:
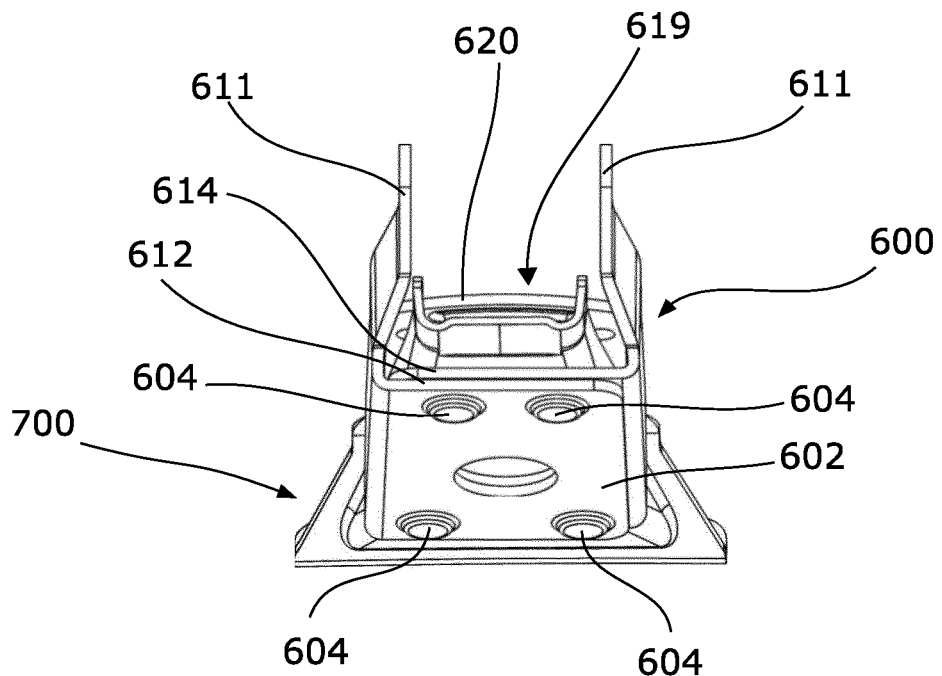
FIG. 9 shows a top view of an assembly comprising a holder and a load carrier bracket.
Figure 10:
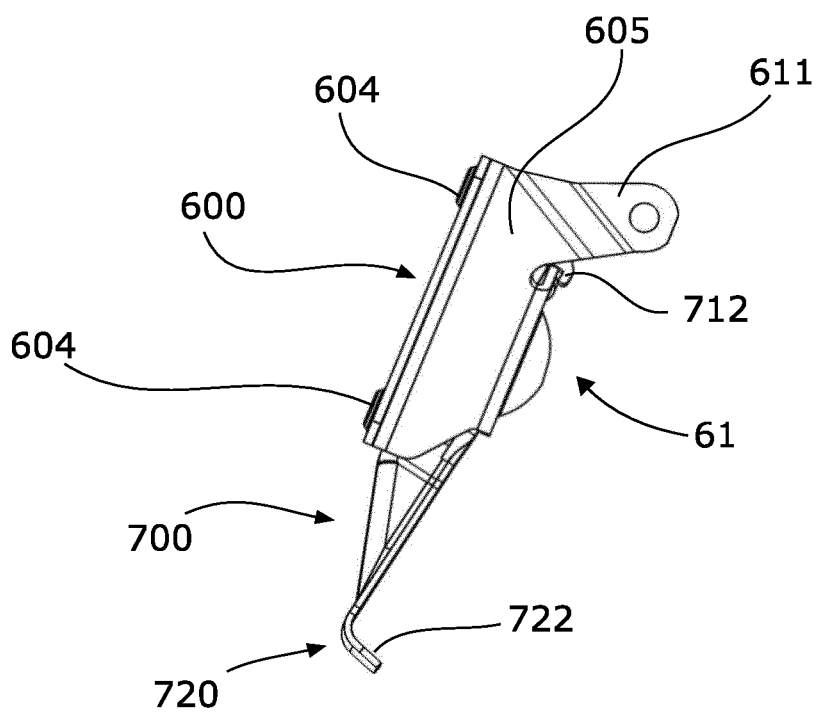
FIG. 10 shows a side view of the assembly of FIG. 9.
Figure 13:
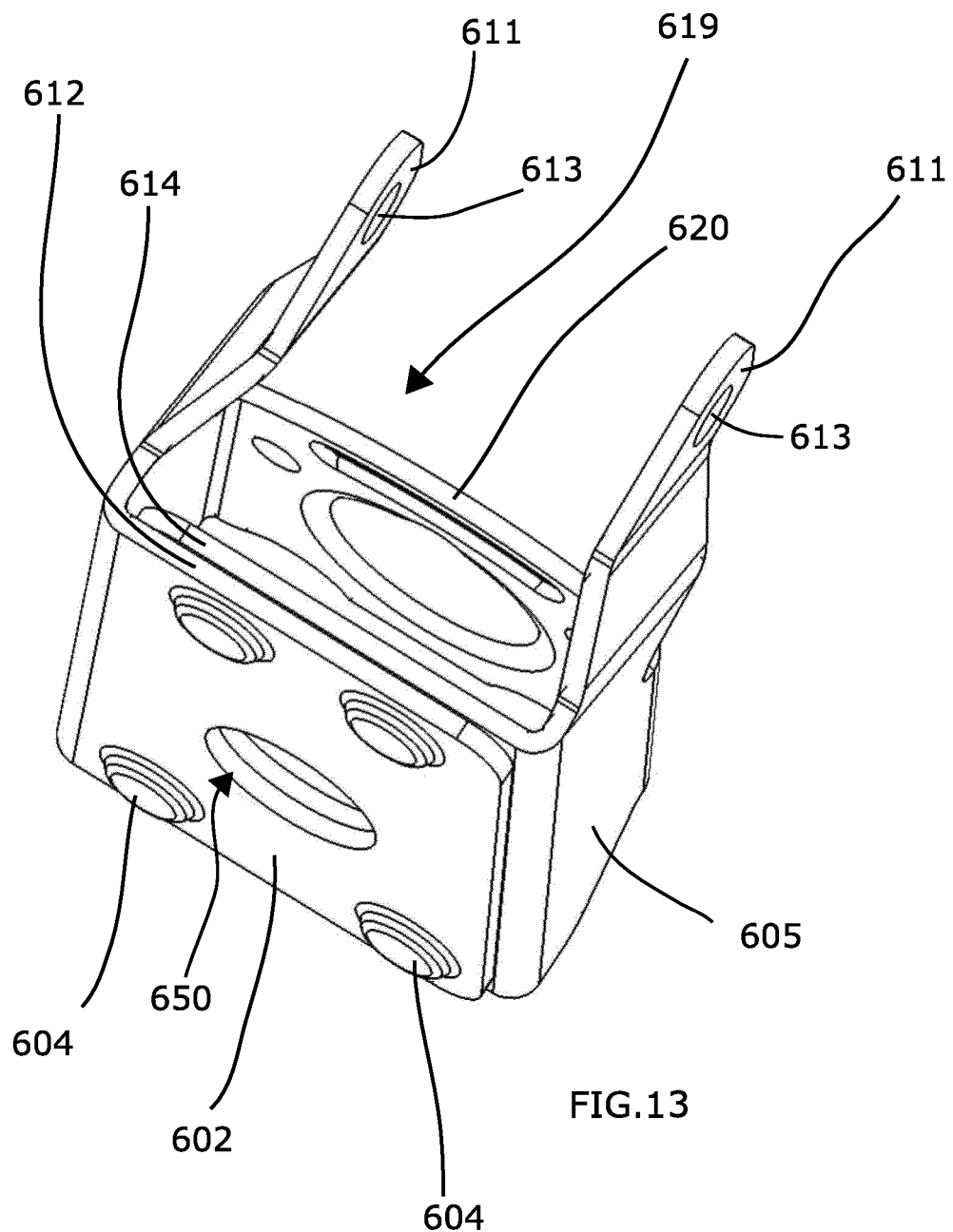
FIG. 13 shows a perspective view of a holder.

The holder 6 is integrally formed by bending a metal sheet into the described shape. The outer wall 602 is defined by an overlap section 601 which is formed by two joining sections 612, 614 of the metal sheet. The joining sections 612, 614 are arranged parallel and in contact with each other. More precisely, the joining sections 612, 614 are joined with each other by press-forming them together. In the present case, the joining sections 612, 614 are clinched together at four joining portions 604. Accordingly, the outer wall 602 is reinforced by using two layers of sheet metal that are joined to each other. As is visible in FIGS. 9 and 13, the joining sections 612, 614, which can also be referred to as overlapping flanges, can extend across the entire width of the holder. This is also depicted in FIG. 13. As is also visible in the drawings, the sleeve portion has a completely closed shape encasing an accommodating space 630 in which the load carrier bracket 700 can be at least partially accommodated as is shown in the configuration of FIG. 2.

The sleeve portion 600 is open on both longitudinal sides. In other words, the sleeve portion 600 comprises a lower opening 622 and an upper opening 615. The lower opening 622 is partially defined by a lower edge portion 621 which in the present case is a lower edge of the outer wall 602. The lower edge portion 621 can also be referred to as force application section as this portion is provided for transferring a force from the holder 6 on a load carrier bracket 700 as will be described later.

Since the holder 6 comprises the above described sleeve portion the holder 6 is able to withstand higher forces so that it is possible to transfer higher forces by means of the lower edge portion 621.

The upper opening 615 of the sleeve portion 600 is partially defined by an upper edge portion 619. The upper edge portion 619 corresponds to the upper edge of the inner wall 603 and is configured for an engagement with the load carrier bracket 700. More precisely, the upper edge portion 619 is convexly formed and comprises a curved supporting surface 620 which faces in the upper direction of the holder 6.

As is also shown in the drawings, the outer wall 602 comprises an access opening 650 providing access to the accommodating space 630 from a front side of the load carrier foot 2. This access opening 650 is designed such that a tool for operating the tightening member 8 can be inserted into the accommodating space 630.

Figure 12:
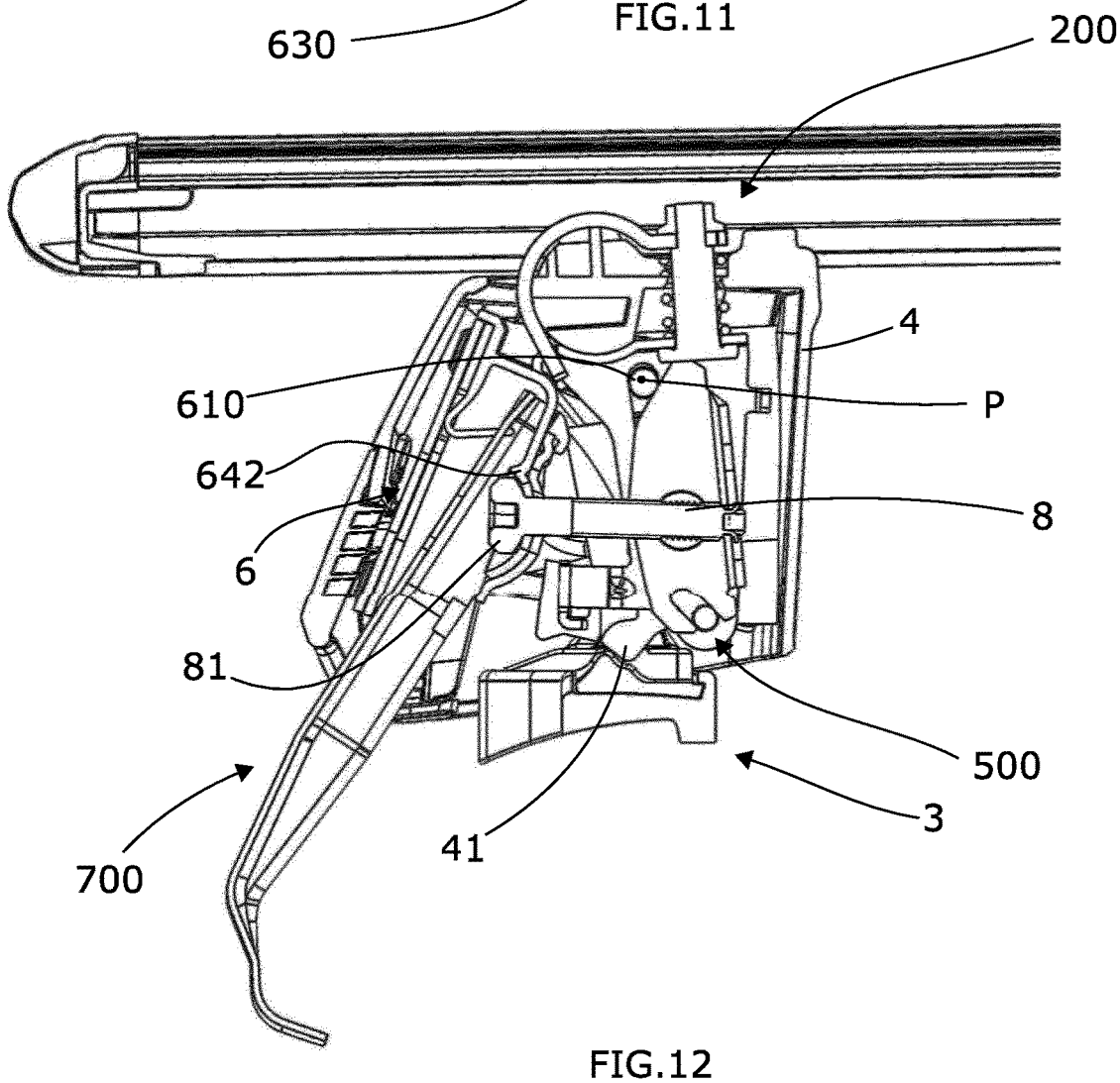
FIG. 12 shows a sectional side view of a load carrier foot mounted to a load bar and comprising a load carrier bracket.

Furthermore, the holder 6 comprises an upper portion 63 which comprises a coupling portion 64. The coupling portion 64 comprises two arms 611 each having an opening 613 for accommodating a pivot pin 610 therein. The pivot pin 610 is shown in FIG. 12 and defines a pivot axis P. In other words, the pivot axis P extends through the centers of the openings 613. Accordingly, the holder 6 is configured for a pivoting movement about pivot axis P. By pivoting the holder 6, a load carrier bracket 700 inserted in the holder 6 can be tightened as will be described later.

The holder 6 comprises a coupling section 61 for supporting the tightening member 8. The tightening member 8 is an element which transfers a pushing force on the coupling portion 61 upon operation of the same. The coupling portion 61 comprises an accommodating recess 607 which is formed in the inner wall 603. The accommodating recess 607 comprises a supporting surface 608 which is formed in a spherical manner.

An opening 609 is provided in the supporting surface 608 allowing to pass a portion of the tightening member through the inner wall 603. Here, the opening is an elongate opening extending along the longitudinal direction of the sleeve portion 600. The elongate opening can have an extension length allowing to insert the tightening member via the lower opening 622. In this case, it is possible to provide an access opening 650 which is smaller than an access opening through which the tightening member 8 is to be inserted. This enhances the rigidity of the sleeve portion 600.

Accordingly, it is possible to support an end portion of the tightening member 8 on the supporting surface 608 and coupling the other end to a further element. Thus, the tightening member 8 is a pulling force transmitting element. More precisely, the tightening member 8 is a shaft nut having an operating portion 81.

As can be gathered from FIG. 2 and FIG. 12, the operating portion 81 comprises an engaging section in the form of a hexagon socket which can be reached via the above described access opening 650. The supporting surface 608 can be used to directly support the tightening member 8. However, in the configuration as described, an intermediate member 642 (see FIG. 2, FIG. 11 and FIG. 12) is provided on the supporting surface 608 and the tightening member 8 is supported on the intermediate member 642. The intermediate member 642 can cover an upper portion of the opening 609 so that the tightening member 8 is supported more properly. The intermediate member 642 can be made of a softer material. In the present configuration, the intermediate member 642 is made from plastics.

Figure 11:
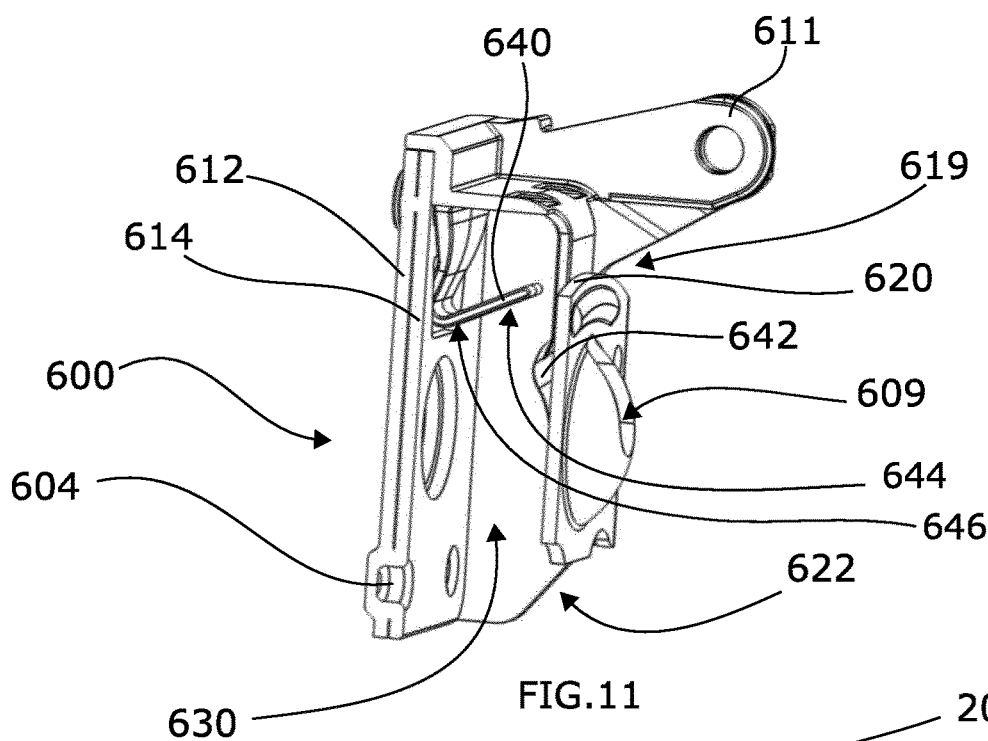
FIG. 11 shows a perspective sectional view of the holder.

As mentioned above, an urging member 640 is provided. The urging member 640 is an elastic element which is accommodated in the accommodating space 630. In the configuration as shown in FIG. 11, the urging member 640 comprises a hook-like shape when viewed from the side. The urging member 640 comprises a contact section 644 protruding into the accommodating space 630 from the outer wall side towards the inner wall side and a supporting section 646 which is accommodated in a recess formed on the inner side of the outer wall, more precisely in the inner joining section 614. In FIG. 11, the urging member 640 is shown in an unloaded state and, therefore, the contact section is substantially straight. As already mentioned before, the urging member 640 is configured to apply an urging force on an inserted load carrier bracket 700 in order to urge the load carrier bracket towards the inner wall 603. The urging member can be made from plastics and can be integrally formed with the intermediate member 642 as described before.

Figure 5:
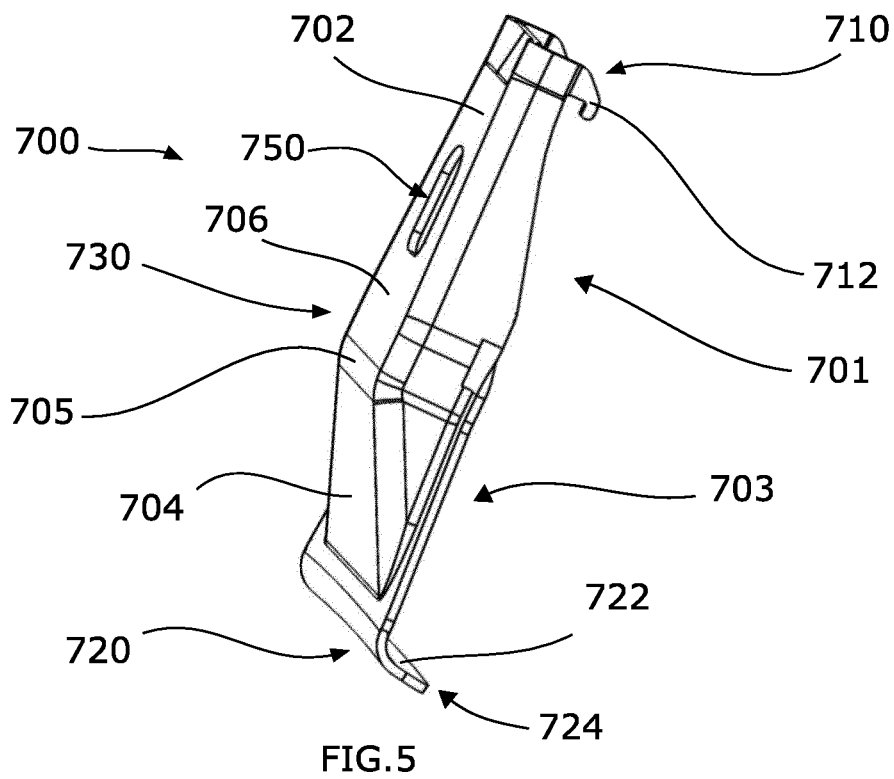
FIG. 5 shows a perspective view of a load carrier bracket according to an embodiment.
Figure 6:
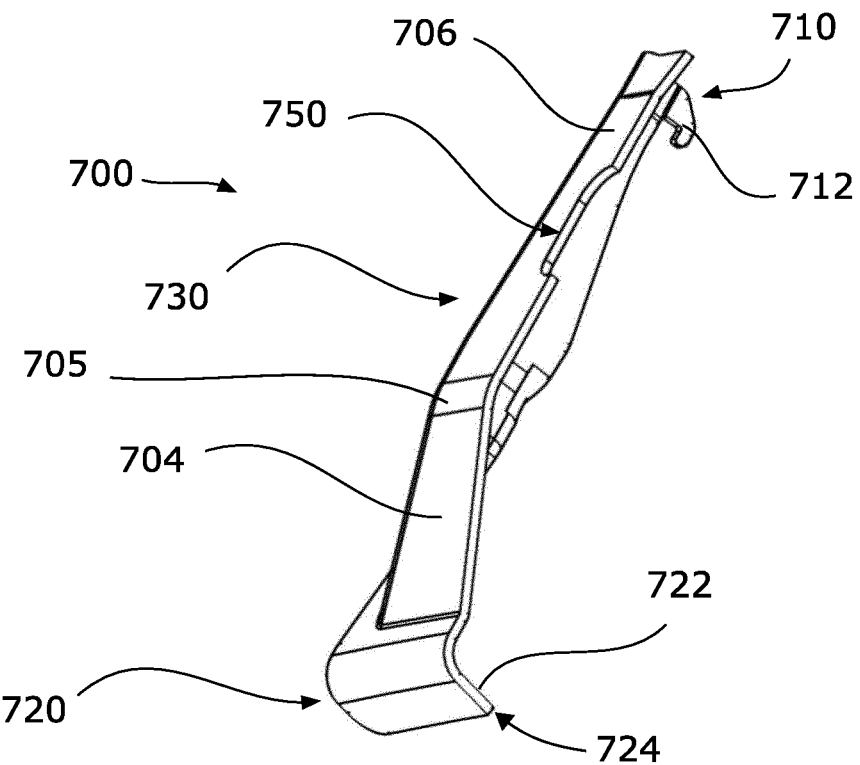
FIG. 6 shows a perspective and sectional view of the load carrier bracket of FIG. 5.
Figure 8:
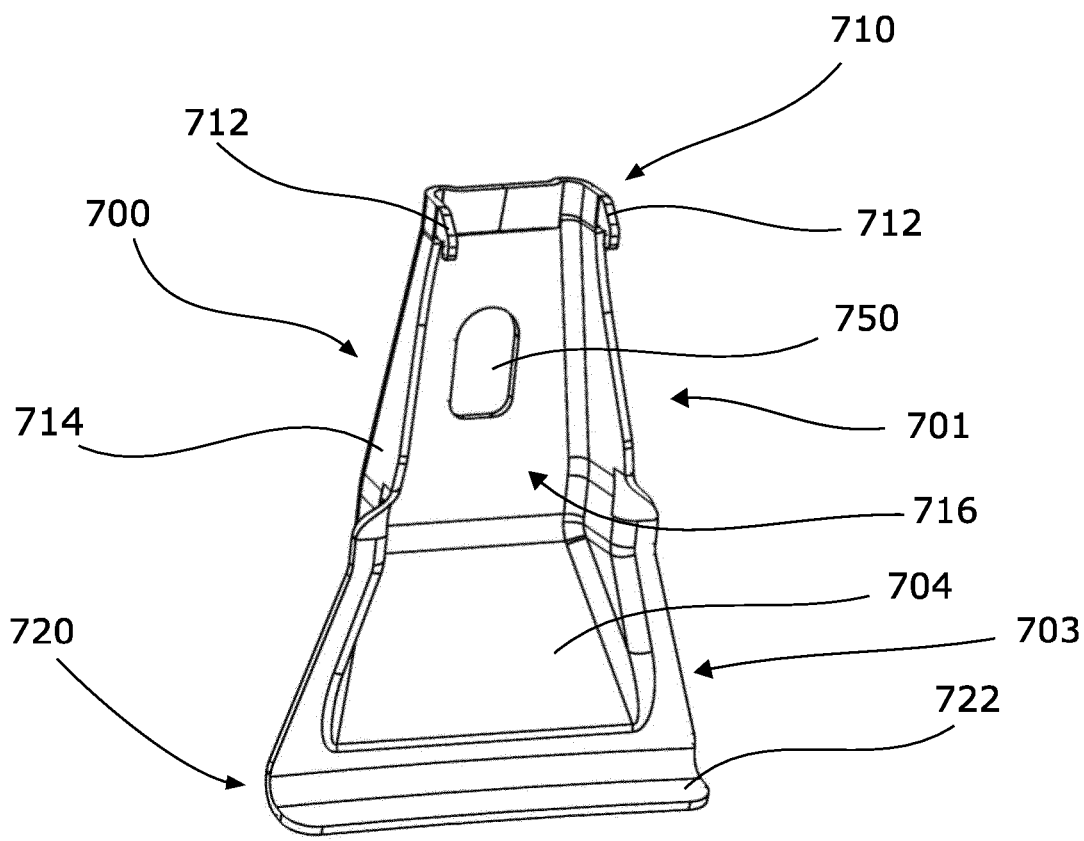
FIG. 8 shows a perspective rear view of the load carrier bracket of FIG. 5.

A load carrier bracket 700 which can be used with the above holder 6 will be described in the following with reference to FIGS. 5, 6 and 8.

The load carrier bracket 700 comprises a vehicle engaging section 720 and a trough-shaped coupling portion 730. The vehicle engaging section 720 is configured to securely grab a portion of a vehicle body. In other words, the vehicle engaging portion 720 is specifically designed so as to fit to a specific vehicle body. As is shown, the vehicle engaging section 720 is a bent or angled portion which is coupled to the trough-shaped coupling portion 730 at one end. At its other end, the vehicle engaging section 720 comprises a free end 724 which protrudes in a direction which is angled with respect to or substantially perpendicular to a longitudinal extension direction of the trough-shaped coupling portion 730. On the free end 724, a contact surface 722 is provided which, when the load carrier foot is clamped on the vehicle roof, is pushed against the vehicle body. The vehicle engaging section 720 is configured, such that the free end 724 can be inserted into a suitable space provided on the vehicle, a space between a closed vehicle door and the vehicle body for instance.

The trough-shaped coupling portion 730 extends from the vehicle engaging section 720 in the longitudinal direction of the load carrier bracket 700. Furthermore, the trough-shaped coupling portion 730 comprises a holder engaging portion 710 which is engageable with the holder 6 of a load carrier foot 2. The trough-shaped coupling portion 730 is funnel-shaped wherein the holder engaging portion 710 is formed at an narrow end of the trough-shaped coupling portion 730.

Moreover, the trough-shaped coupling portion 730 is continuously convexly formed in its longitudinal direction and comprises an outer surface 702 adapted to receive a force from the holder 6 of the load carrier foot 2. In the context of this disclosure, continuously convexly formed means that there is a wall portion which is continuously convexly formed providing the load carrier bracket with a continuous bulging. Furthermore, continuously convexly formed means that the course of a section in longitudinal direction of the load carrier bracket is curved in only one direction and does not comprise any curvatures in the opposite direction. It is to be noted, that curved is not to be understood in the strict sense that every section has to be curved. Rather, as is shown in the drawings, substantially straight sections 704, 706 can be provided which are connected by a curved section 705 resulting in an overall curved shape.

The load carrier bracket can be formed symmetrical with respect to a middle plane at least in sections. Since the load carrier bracket has to fit to different types of vehicles, it is necessary to form the vehicle engaging section 720 according to the vehicle body of the vehicle.

Accordingly, a lower portion 703 of the load carrier bracket 700 has to be formed corresponding to the vehicle body type. On the other hand, the configuration of the load carrier foot 2 remains the same for different vehicles at least regarding the fixation and engagement of the load carrier bracket 700. Therefore, an upper portion 701 of the load carrier bracket 700 which is inserted into the holder 6 can always be formed in the same manner. In practice, it turned out that the section-wise forming of the load carrier bracket 700, i.e. the separate forming of the upper portion 701 and the lower portion 703, is cost efficient as it allows the use of one and the same tool for forming the upper portion 701. In this way, only a respective specific smaller tool have to be provided for forming the lower portion 703.

The trough-shaped coupling portion 730 extends substantially over the entire length of the bracket 700 and is uninterrupted. In other words, only a single trough-shaped coupling portion is provided. Furthermore, the trough-shaped coupling portion 730 at least partially comprises a box-like shape. More precisely, the trough-shaped coupling portion 730 comprises two side walls 714 and a bottom wall 716 which is arranged substantially perpendicular to the side walls 714. The bottom wall 716 and, consequently, the outer surface 702 is convexly shaped giving the overall load carrier bracket 700 a convex shape when viewed from the side. In other words, the trough-shaped coupling portion 730 provides a bulging in only one direction. The bulging is provided on a side of the load carrier bracket 700 opposite to the side where the free end 724 of the vehicle engaging section 720 is provided. In the shown configuration, the bottom wall 716 comprises a curved section 705 arranged between two substantially flat sections 704, 706 so that the overall configuration is curved in only one direction. In other words, the bottom wall 716 does not comprise a portion which is curved in the opposite direction.

The holder engaging section 710 is configured such that the load carrier bracket 700 can be hooked on the holder 6. In the shown configuration, the holder engaging section 710 comprises two hooks 712 which are arranged at a distance to each other in lateral direction of the load carrier bracket 700. The hooks 712 are configured such that they can be engaged with the upper edge portion 619 of the sleeve portion 600 of the holder 6. The hooks 712 and the free end 724 of the vehicle engaging section 720 can be referred to as protrusions of the load carrier bracket 700 which protrude from the same side of the load carrier bracket 700. More precisely, when the load carrier bracket 700 is inserted in the load carrier foot 2 and the load carrier foot 2 is mounted on a vehicle, the hooks 712 and the free end 724 protrude towards the vehicle. In other words, the load carrier bracket 700 is inserted into the holder 6 such that the hooks 712 are located on the side of the inner wall 603 of the holder.

Assemblies where the above described load carrier bracket 700 is inserted into a holder 6 are shown in FIGS. 2, 9, 10, 12 and 29 to 32.

The load carrier bracket 700 is inserted into the holder 6 from below. The upper portion 701 of the load carrier bracket 700 is inserted into the sleeve portion 600 through the lower opening 622 up to a position where the holder engaging portion 710 partially protrudes from the upper opening 615. More precisely, the load carrier bracket 700 is brought into a position in which the hooks 712 are located above the upper edge portion 619 so that the hooks 712 can be brought in contact with the supporting surface 620 of the upper edge portion 619.

As described above, the holder 6 comprises the urging member 640. Upon inserting the bracket, the urging member 640 comes into contact with the upper portion 701 of the load carrier bracket 700 and pushes the holder engaging portion 710 inward, i.e. towards the upper edge portion 619 so that the hooks 712 are brought into position for an engagement with the upper edge portion 619 and are held there. Accordingly, the load carrier bracket is securely held on the upper edge portion 619 and can only be removed when the load carrier bracket 700 is moved such that the holder engaging portion 710 is moved against the urging force of the urging member 640.

As mentioned before, the upper edge portion 619 is convexly curved and the hooks 712 are arranged at a distance with respect to each other. Thus, the load carrier bracket 700 is supported on the upper edge portion at two different points. The upper edge portion is wider than the width of the holder engaging section 710 leading to a configuration in which the hooks can slide on the surface 620. In other words, the upper portion 701 of the load carrier bracket 700 is formed such that the load carrier bracket is hingedly held on the upper edge portion 619. This allows a pivoting movement of the load carrier bracket 700 about the center of the curvature of the surface 620. In this way, the load carrier bracket can orient itself according to the shape of the vehicle body when the same is tightened by moving the holder 6.

Figure 3:
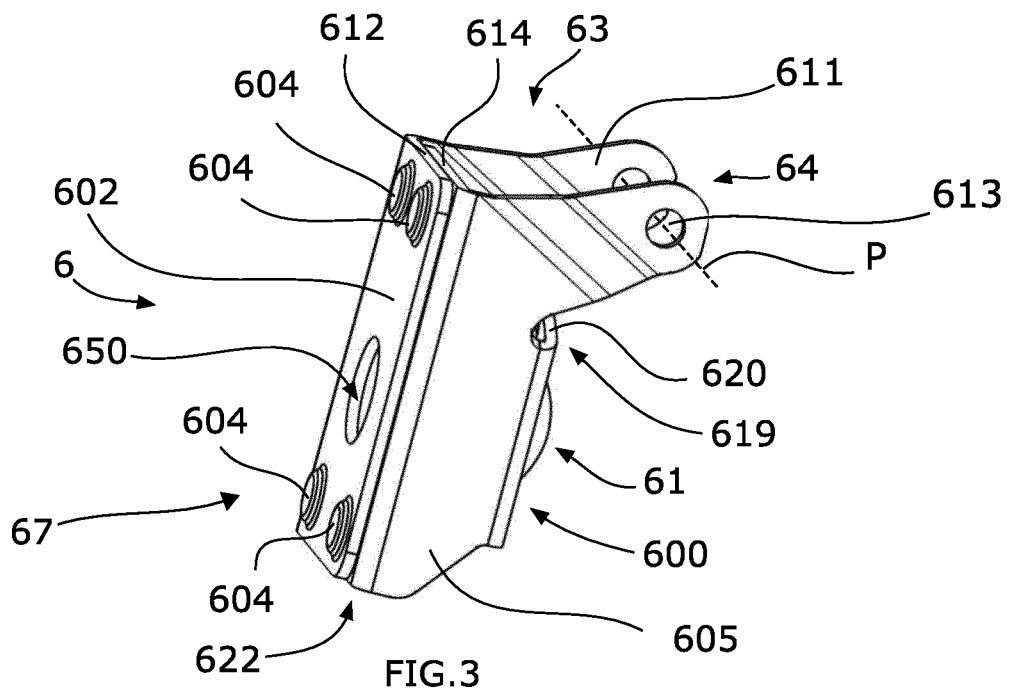
FIG. 3 shows a perspective view of a holder according to an embodiment.
Figure 4:
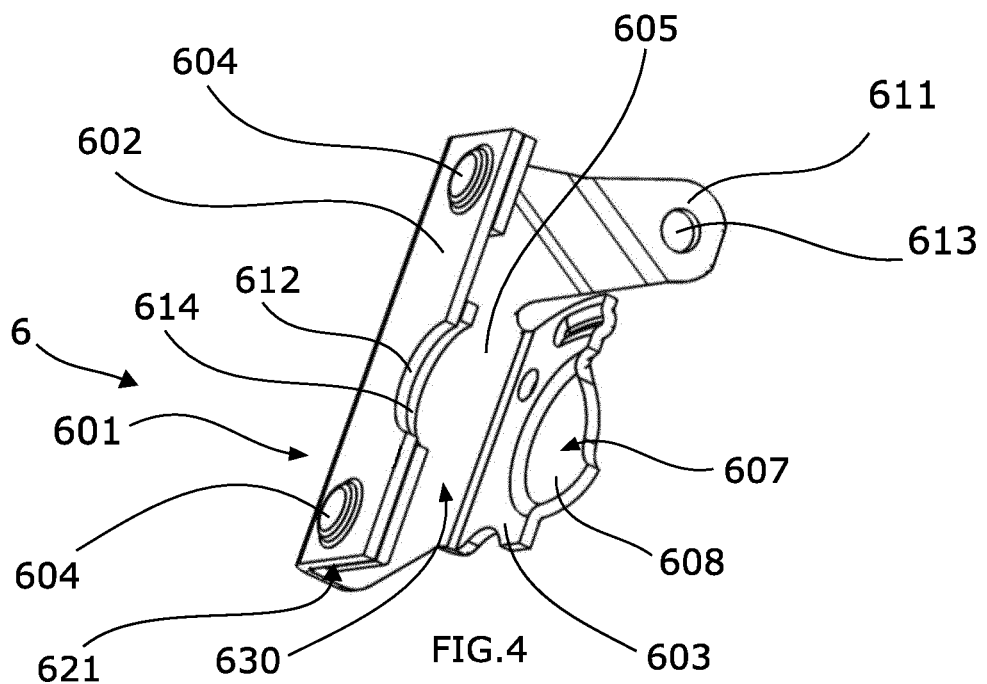
FIG. 4 shows a perspective and sectional view of the holder of FIG. 3.

As soon as the load carrier bracket 700 is engaged with the holder 6 in the above described way, the holder 6 can be rotated about the pivot axis P in counterclockwise direction in FIG. 3 in order to tighten the load carrier bracket 700. The rotation of the holder 6 is effected by an operation of the tightening member 8 which is supported on the inner wall 603 of the holder 6. By moving the holder 6, the load carrier bracket 700 is clamped between the holder 6 and the vehicle body. More precisely, the lower edge portion 621 of the holder 6 is moved towards the vehicle when the tightening member is tightened which leads to a state in which the lower edge portion 621 contacts the outer surface 702 of the load carrier bracket 700 such that the lower edge portion 621 contacts the outer surface 702 right above the curved section 705 in order to push the load carrier bracket towards the vehicle.

Furthermore, the holder 6 is held such that the pivot axis P also moves upward during the tightening process. Since the load carrier bracket 700 is supported on the upper edge portion 619 of the holder, a movement of the holder in the upward direction pulls the load carrier bracket in the upward direction so that the contact surface 722 is moved upwards and brought into firm contact with the vehicle body. Due to the shape of the holder and the shape of the bracket, it is possible to generate a higher clamping force.

As is shown in the figures, the load carrier bracket 700 comprises an access opening 750. The access opening 750 is provided such that when the load carrier bracket 700 is hooked into the holder 6 in the above described way, the access opening 750 is aligned with the access opening 650 of the holder 6. Since both openings are aligned, it is possible to reach the operating portion 81 of the tightening member 8 from the outside by passing a tool through the openings. Due to this configuration, it is possible to support the tightening member on the inner wall 603 of the holder 6. Furthermore, it is possible to insert the tightening member 8 into the holder 6 prior to the insertion of the load carrier bracket 700.

A possible use of the above assembly comprising the load carrier bracket 700 and the holder 6 in a load carrier is shown in FIG. 12. The load carrier comprises a load bar 300 which is coupled to a load carrier foot 2. The load carrier foot 2 comprises the above described holder 6. Furthermore, the above described load carrier bracket 700 is inserted in the holder 6. The load carrier foot 2 comprises a foot pad 3 which is brought in contact with the roof of a vehicle when the load carrier is mounted. The holder 6 is operatively coupled with a tightening mechanism 500 of the load carrier foot 2. The tightening mechanism 500 is operated by the tightening member 8. The tightening mechanism 500 is configured to effect a movement of the holder 6 in the above described way about the pivot axis P and to operate a locking mechanism 200 for securely locking the load bar 300 to the load carrier foot 2 when the tightening member 8 is operated. For that, the tightening member 8 is threadedly engaged with a pin 515 which is pivotably held in a force distribution member of the tightening mechanism 500. The force distribution member transfers an input force on two application sections.

Figure 14:
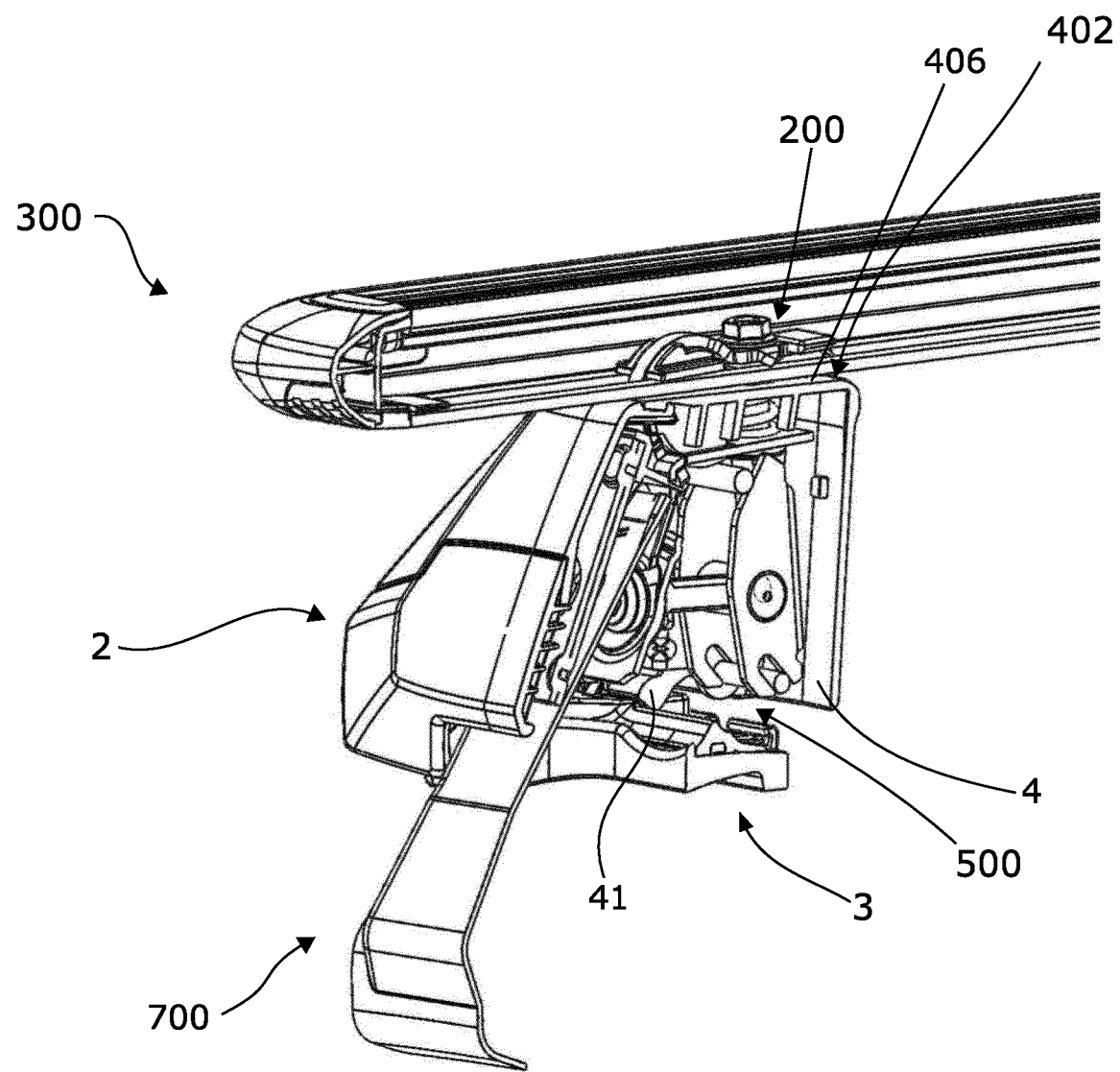
FIG. 14 shows a perspective sectional view of a load carrier foot carrying a load bar.
Figure 19:
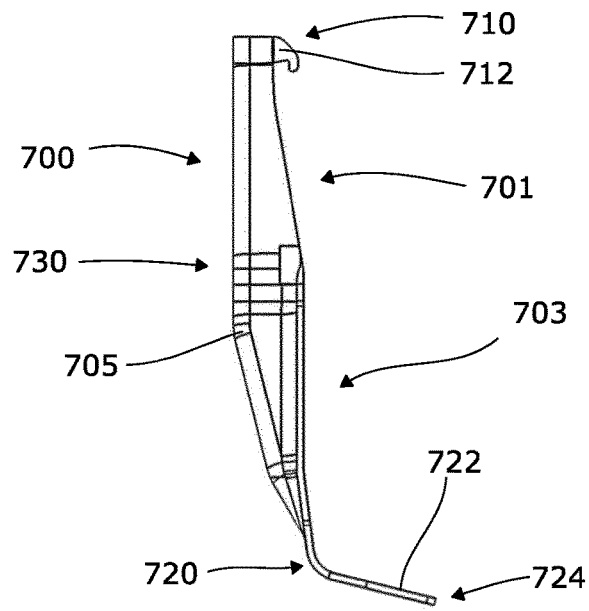
FIG. 19 shows a side view of a load carrier bracket according to an embodiment.
Figure 20:
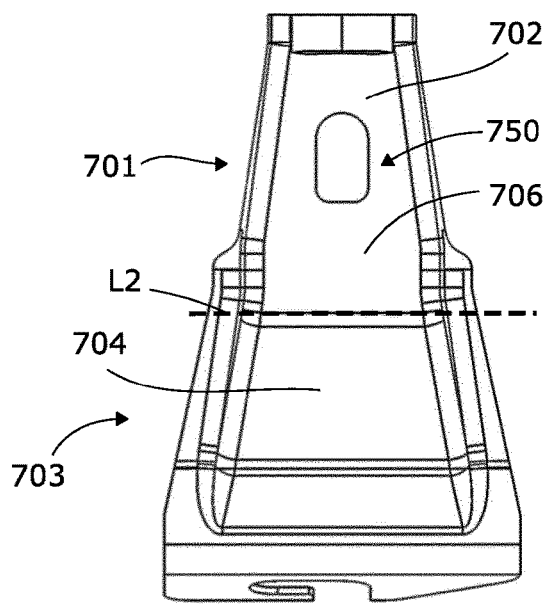
FIG. 20 shows a front view of the load carrier bracket of FIG. 19.
Figure 21:
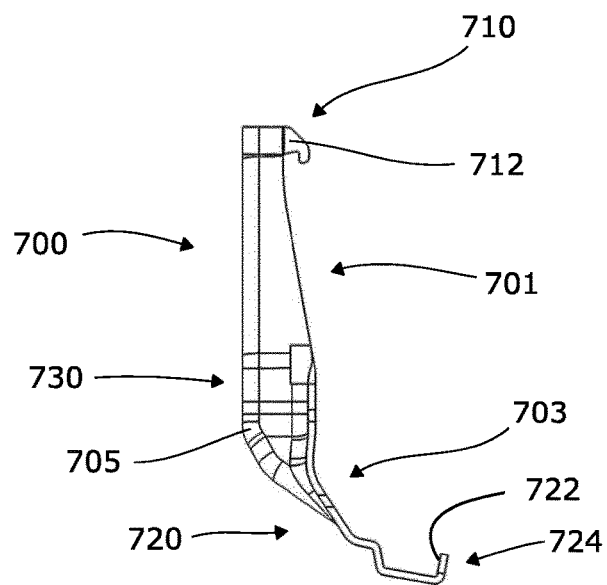
FIG. 21 shows a side view of a load carrier bracket according to an embodiment.
Figure 22:
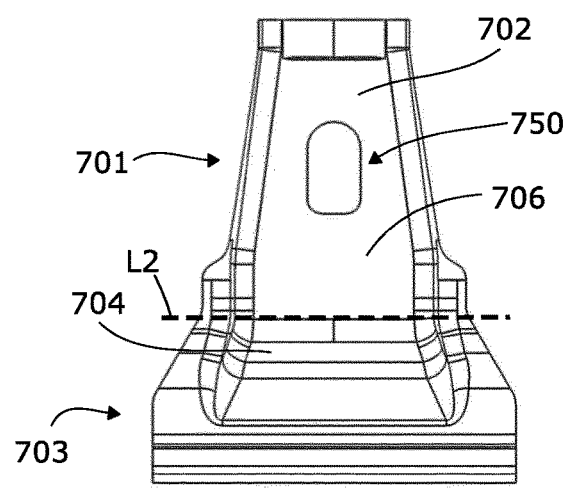
FIG. 22 shows a front view of the load carrier bracket of FIG. 21.
Figure 23:
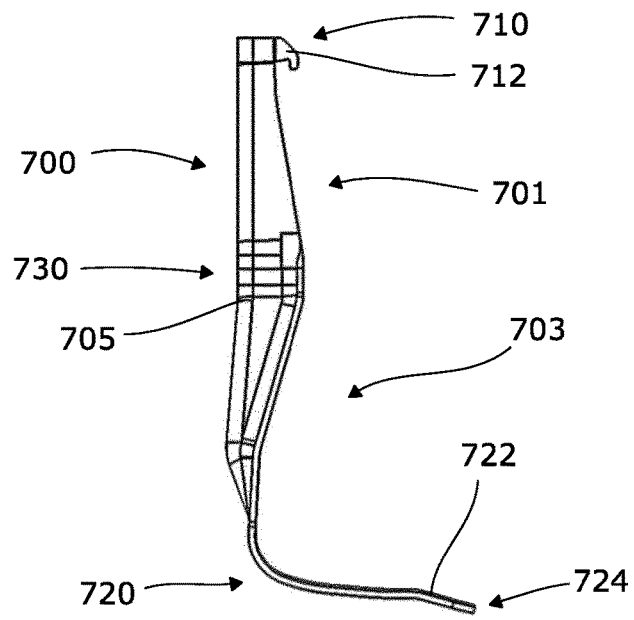
FIG. 23 shows a side view of a load carrier bracket according to an embodiment.
Figure 24:
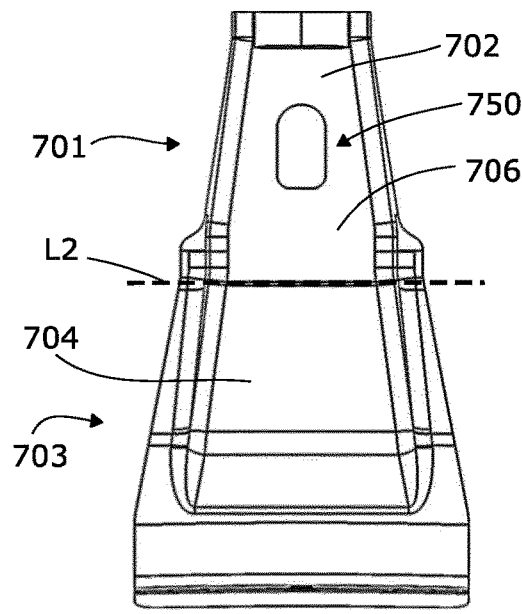
FIG. 24 shows a front view of the load carrier bracket of FIG. 23.
Figure 25:
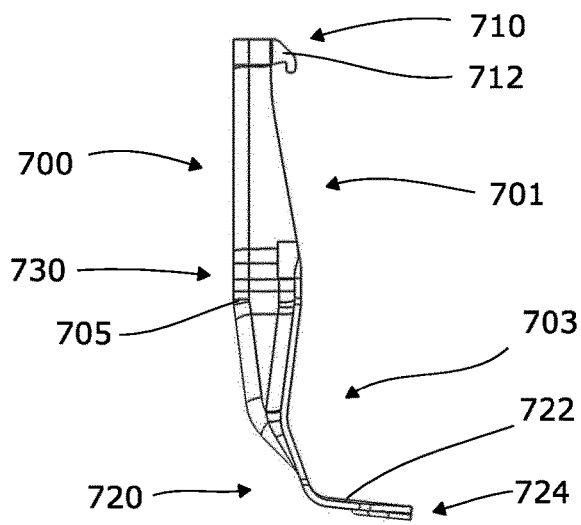
FIG. 25 shows a side view of a load carrier bracket according to an embodiment.
Figure 26:
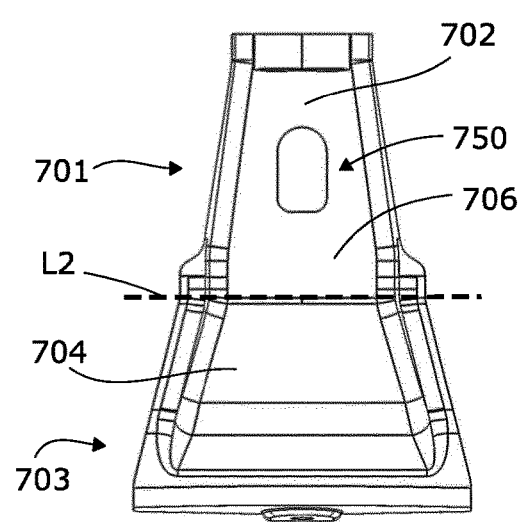
FIG. 26 shows a front view of the load carrier bracket of FIG. 25.
Figure 27:
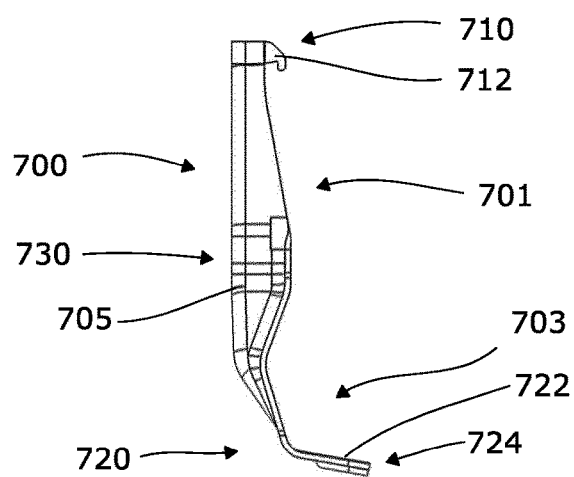
FIG. 27 shows a side view of a load carrier bracket according to an embodiment.
Figure 28:
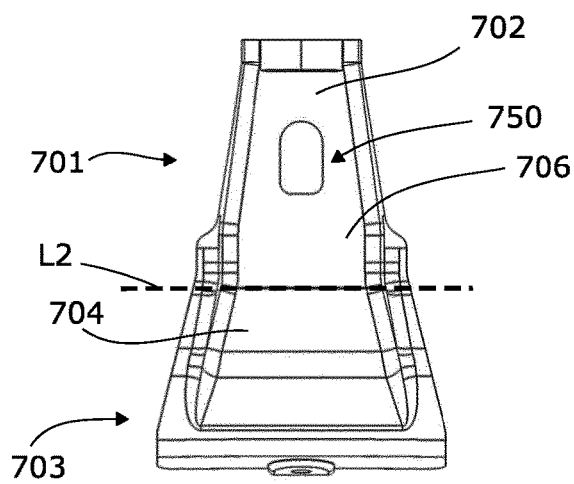
FIG. 28 shows a front view of the load carrier bracket of FIG. 27.

FIG. 14 shows a perspective view sectional view of a load carrier comprising a load bar 300, a load carrier foot 2 supporting the load bar 300 and the load carrier bracket 700. The load carrier foot 2 comprises the locking mechanism 200 for locking the load bar 300 on the load carrier foot 2, more precisely for clamping the load bar 300 on a supporting portion 402 of the load carrier foot 2, which is a portion of the rear cover 4. In the disclosed configuration, the supporting portion 402 is an integral part of the rear cover 4 of the load carrier foot 2. The rear cover 4 can also be referred to as support member 400 for supporting the load bar thereon. The supporting portion 402 comprises a supporting surface 406 formed in the rear cover 4. Accordingly, the rear cover 4 acts as a support for supporting the load bar 300. In other words, the load bar 300 is supported on an upper portion of the rear cover 4. The rear cover 4 is supported on the foot pad 3. More precisely, the rear cover 4 comprises a coupling portion 41 which is engaged with the foot pad 3. This coupling portion is shown in FIGS. 12 and 14. The foot pad 3 is adapted to contact the vehicle roof and for transferring a load onto the vehicle roof. The rear cover, can be movably, e.g. rotatably, supported on the foot pad. More precisely, a lower portion of the rear cover can be specifically designed to be supported on an upper side of the foot pad 3. Thus, the rear cover 4 is able to transfer a load received from a load bar 300 onto the foot pad 3. In this way, a major part of a normal force applied on the load carrier foot 2 by the load bar 300 is directly transferred to the foot pad 3 by means of the rear cover. The configuration is such that the foot pad 3 only receives forces from the rear cover.

Further embodiments of load carrier brackets will be described in the following with reference to FIGS. 15-28.

FIG. 15 shows a side view of the upper portion 701 of the load carrier bracket 700. This upper portion 701 is formed as described with reference to FIGS. 5, 6 and 8 and is identical in all further described embodiments. In FIG. 15 the line L1 indicates a first characteristic of the upper part 701. More precisely, the bracket 700 widens from the holder engaging section 710 towards the lower portion 703 when viewed from the side. In other words, the width of the side walls 714 increases towards the above mentioned curved section 705 which marks a lower end of the upper part 701. The boundary between the upper portion 701 and the lower portion 703 is formed by the lower end portion as shown in FIG. 15 and indicated by line L2 in FIG. 16 which is a front view of the upper portion 701 of the load carrier brackets 700. The side walls 714 can be inclined with respect to the longitudinal direction of the load carrier bracket 700 in order to fit to the accommodating space 630 as formed in the holder 6. More precisely, the side walls 714 are arranged at an angle such that the load carrier bracket 700 widens from the holder engaging section 710 towards the lower portion 703 when viewed from the front as can be the case with the side walls of the holder described above. The inclination of the side walls is depicted by lines L5 and L8 in FIG. 16. As is further shown in FIG. 16, the upper portion 701 can comprise side wall sections which are formed parallel with respect to each other and parallel to the longitudinal extension direction of the load carrier bracket 700. These side wall sections can be formed in the area of the holder engaging section 710 and the lower end of the upper part 701 on the opposite side of the upper part 701. The extension of the side wall sections is depicted by lines L3, L4, L6 and L7.

The lower portion 703 is different in every embodiment. More precisely, the lower portion 703 is respectively adapted to fit to different vehicles. Example shapes of the load carrier bracket 700, i.e. specific shapes of the lower portion 703 are shown in FIGS. 17 to 28. The shapes vary in the lower portion 703, for example regarding the trough-shaped portion in formed in the lower portion 703 and regarding the vehicle engaging section 720. Most of the shapes follow the above general shape as described before and are convexly shaped. For example, in FIG. 23, an embodiment is shown in which the curved section 705 is bent in opposite direction compared to other embodiments.

Figure 33:
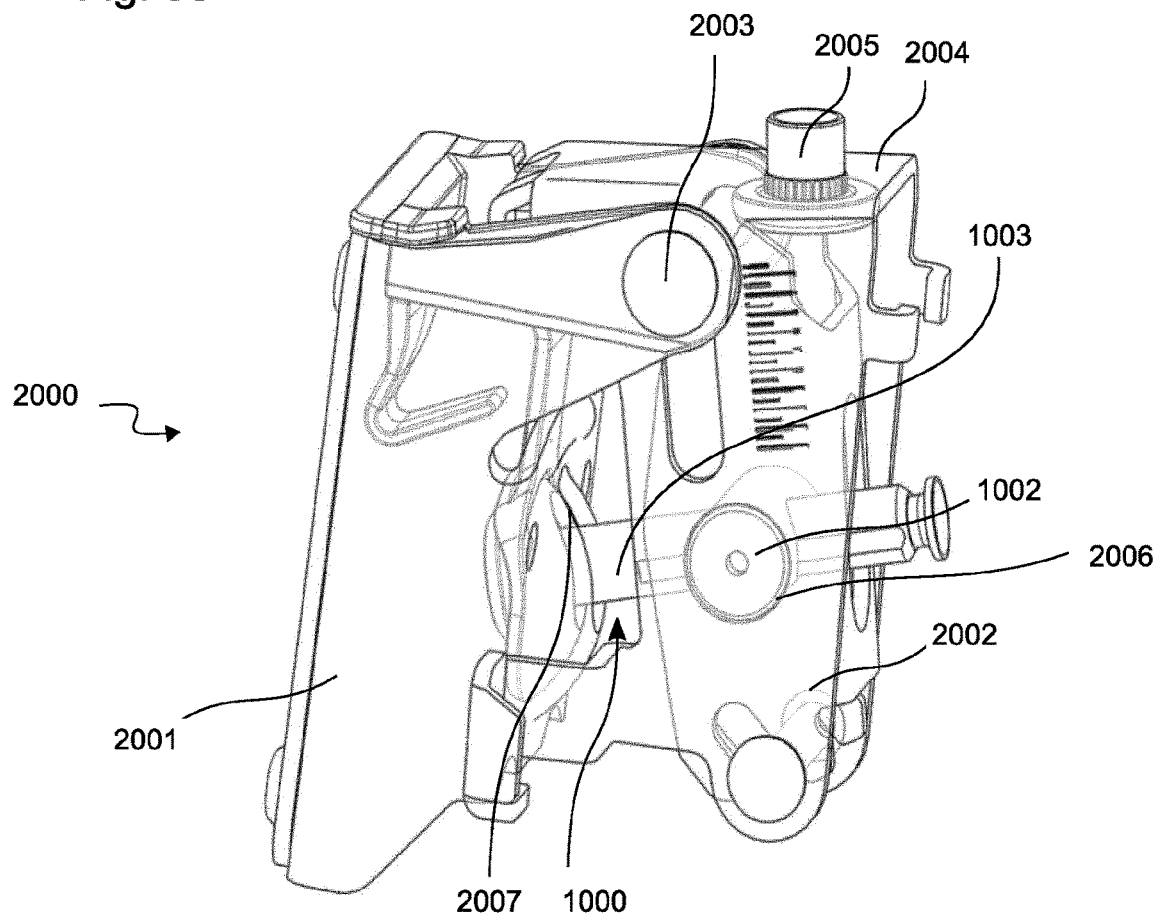
FIG. 33 shows a roof rack foot according to an embodiment of the present invention in a perspective side view.

FIG. 33 shows a roof rack foot 2000 according to an embodiment of the present invention in a perspective side view. By means of the roof rack foot 2000, a profile element of a roof rack, for example a cross bar, can be attached to the roof of a vehicle. For this purpose, the roof rack foot 2000 according the present embodiment comprises a first clamping element 2001 and a second clamping element 2002, which are rotatably connected to each other via a joint/hinge 2003. A roof railing or any other type of element provided on the roof of a vehicle may be clamped between the clamping elements 2001 and 2002, for example. On the upper side, the roof rack foot 2000, presently in particular the second clamping element 2002, forms a support surface 2004, onto which the profile element, for example the cross bar, can be placed. By means of a fastening element 2005, the profile element may be detachably attached to the support surface 2004 of the roof rack foot 2000.

The first clamping element 2001 and the second clamping element 2002 may be adjusted relatively to each other via an adjustment arrangement 1000. More precisely, by actuating the adjustment arrangement 1000, a clamping force may be applied to an element fixed to the vehicle roof, such as a roof railing, via the clamping elements 2001 and 2002. If this clamping force is to be maintained during operation even with occurrence of strong vibrations, it must be prevented that the adjustment arrangement loosens/releases and that the clamping elements 2001 and 2002 move away from each other, as this would result in a reduction of the clamping force.

Figure 34:
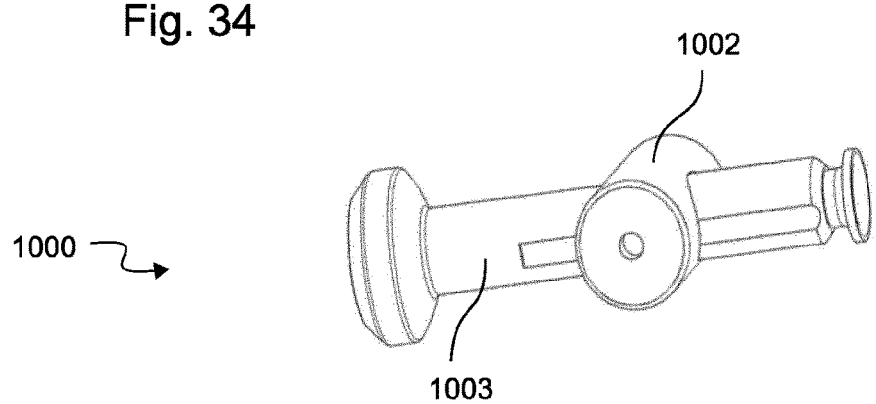
FIG. 34 shows an adjustment arrangement of the roof rack foot shown in FIG. 33 in a perspective side view.

FIG. 34 shows the adjustment arrangement 1000 from FIG. 1 in a perspective side view. The adjustment arrangement 1000 comprises a barrel nut 1002 and a bolt 1003. As shown in FIG. 33, the barrel nut 1002 is provided in an opening 2006 of the second clamping element 2002. The bolt 1003 of the adjustment arrangement 1000, on the other hand, projects through a slot 2007 of the first clamping element 2001 and is arranged with a head 1021, described below, on a side of the first clamping element 2001 facing away from the second clamping element 2002. The bolt 1003 is screwed into the barrel nut 1002, as shown in FIGS. 33 and 34. By further screwing the bolt 1003 into the barrel nut 1002, the clamping elements 2001 and 2002 can be further pivoted towards each other via the joint 2003 in order to initiate a clamping operation and to increase a clamping force, respectively. However, if the bolt 1003 is unscrewed from the barrel nut 1002, the clamping elements 2001 and 2002 may be separated from each other and a clamping force can be reduced.

Figure 35:
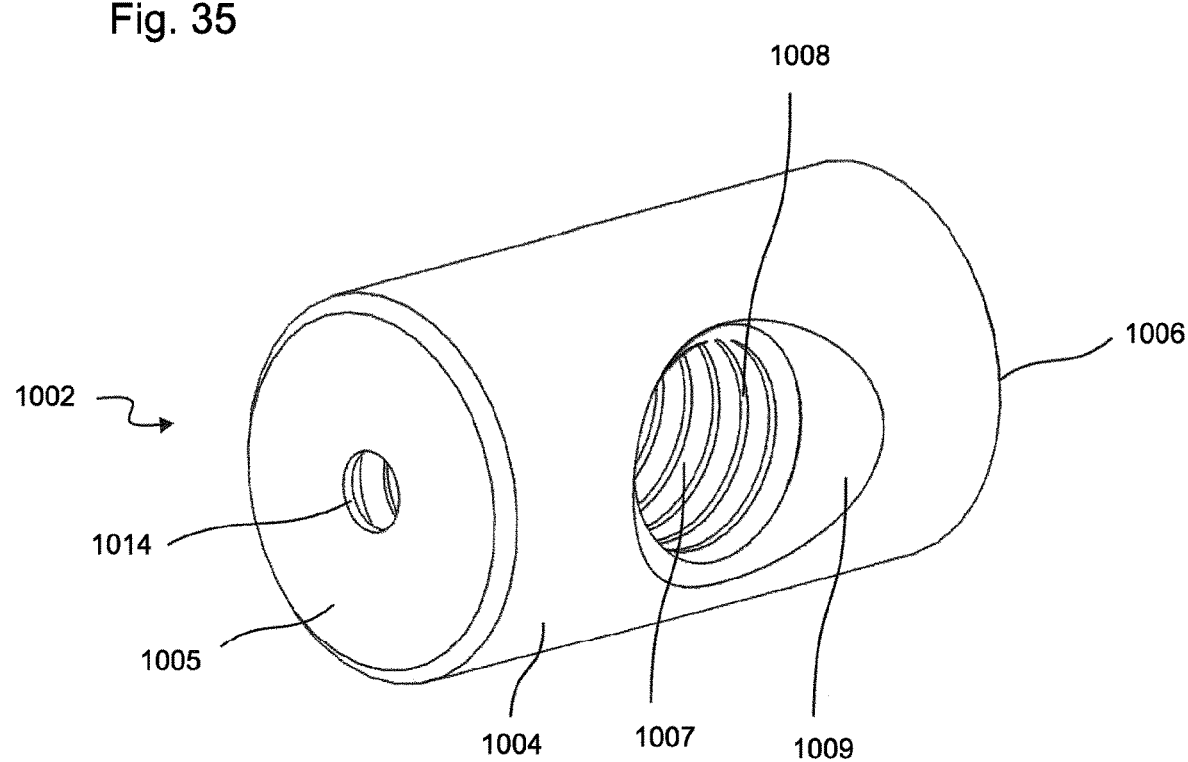
FIG. 35 shows a barrel nut of the adjustment arrangement of FIG. 34 in a perspective side view.
Figure 36:
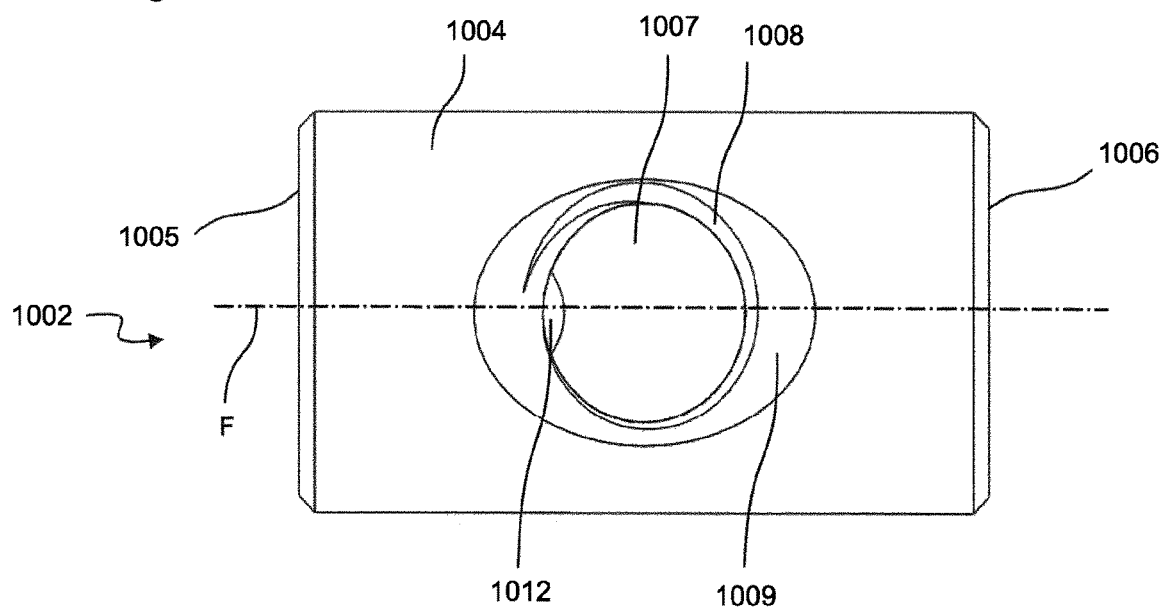
FIG. 36 shows the barrel nut of FIG. 35 in a side view.

As shown in FIGS. 35 and 36, the barrel nut 1002 comprises a circular cross-section, wherein the length of the barrel nut may be more than 1,5 times, preferably more than 1,7 times, more preferably about 1,8 times the diameter of the barrel nut 1002. The barrel nut 1002 comprises a lateral face 1004 as well as a first side face 1005 and a second side face 1006. In the present embodiment, the barrel nut 1002 and thus the lateral face 1004 are formed with a constant diameter, wherein the side faces 1005 and 1006 are arranged parallel to each other. The barrel nut 1002 of the present embodiment is therefore designed as a cylindrical nut. In addition, the barrel nut 1002 comprises a barrel axis F, which is, in the present embodiment, a symmetry axis of the barrel nut 1002. The symmetry axis is shown in FIG. 36.

In addition, the barrel nut 1002 comprises a threaded through hole 1007, which extends perpendicular to the barrel axis F in the present case. The threaded through hole 1007 is arranged and configured in such a way that its central axis intersects with the barrel axis F. The threaded through hole 1007 is, in the present embodiment, arranged centrally between the side faces 1005 and 1006. The threaded through hole 1007 comprises an internal thread 1008 and is preferably provided on one or both sides towards the lateral face 1004 with a thread runout 1009, for example with a chamfer.

In addition, the barrel nut 1002 comprises a bore 1010, which is formed coaxially with the barrel axis F. In the present embodiment, the bore 1010 extends from the side face 1005 into the barrel nut 1002 and up to the threaded through hole 1007. The bore 1010 is configured in such a way that it creates a spatial connection to the threaded through hole 1007. In the area immediately adjacent the threaded through hole 1007, the bore 1010 comprises a narrowing portion 1011, in which the diameter of the bore 1010 successively decreases towards the threaded through hole 1007. The diameter of the bore 1010 has also been reduced by means of a clinching method at the end facing away from the threaded through hole 1007. By this, a clinching portion 1014 was formed. In the present embodiment, the diameter of the bore 1010 was not completely closed by the clinching method, but only reduced by about half.

Figure 37:
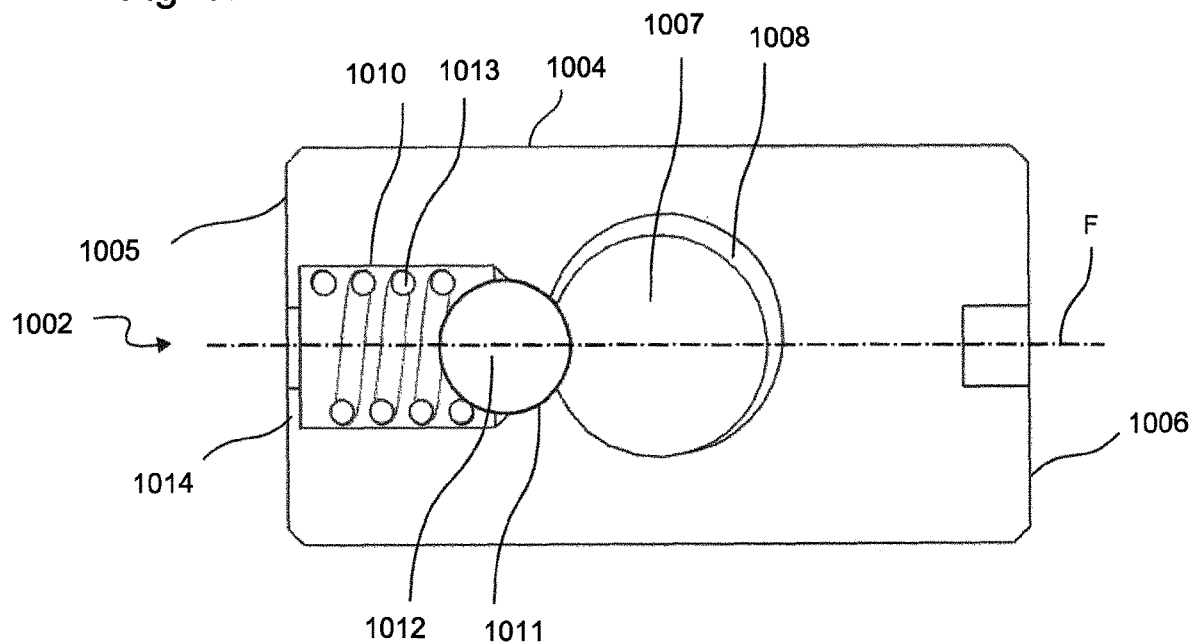
FIG. 37 shows the barrel nut of FIG. 36 in a longitudinal sectional view.
Figure 38:
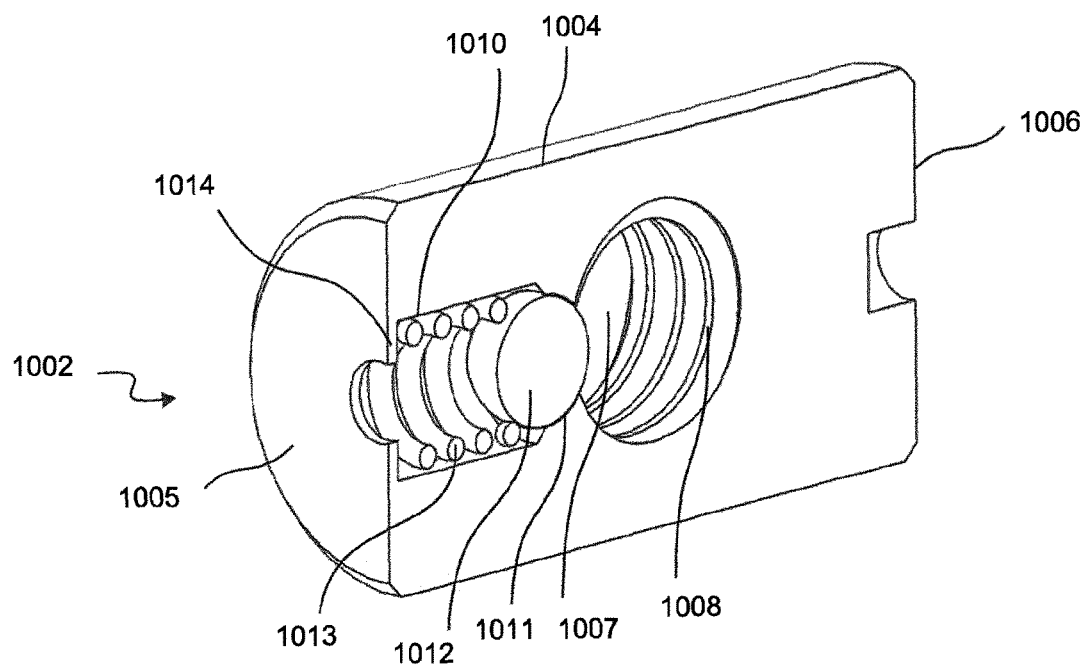
FIG. 38 shows the barrel nut of FIG. 36 in a perspective longitudinal sectional view.

The clinch portion 1014 holds a compression spring 1013 in position within the bore 1010, via which a ball 1012 is biased towards the threaded through hole 1007. The ball 1012 represents a locking element. In other words, the barrel nut 1002 is configured such that the ball 1012 may be biased towards the threaded through hole 1007 by means of the compression spring 1013, wherein the spring 1013 may be supported on the clinching portion 1014. The narrowing portion 1011 is adapted in its profile to the dimension of the ball 1012 such that the ball 1012 is retained in the hole 1010 therewith, but projects into the threaded through hole 1007 when it comes into contact with the narrowing portion 1011, as shown in FIGS. 36 to 38.

Figure 39:
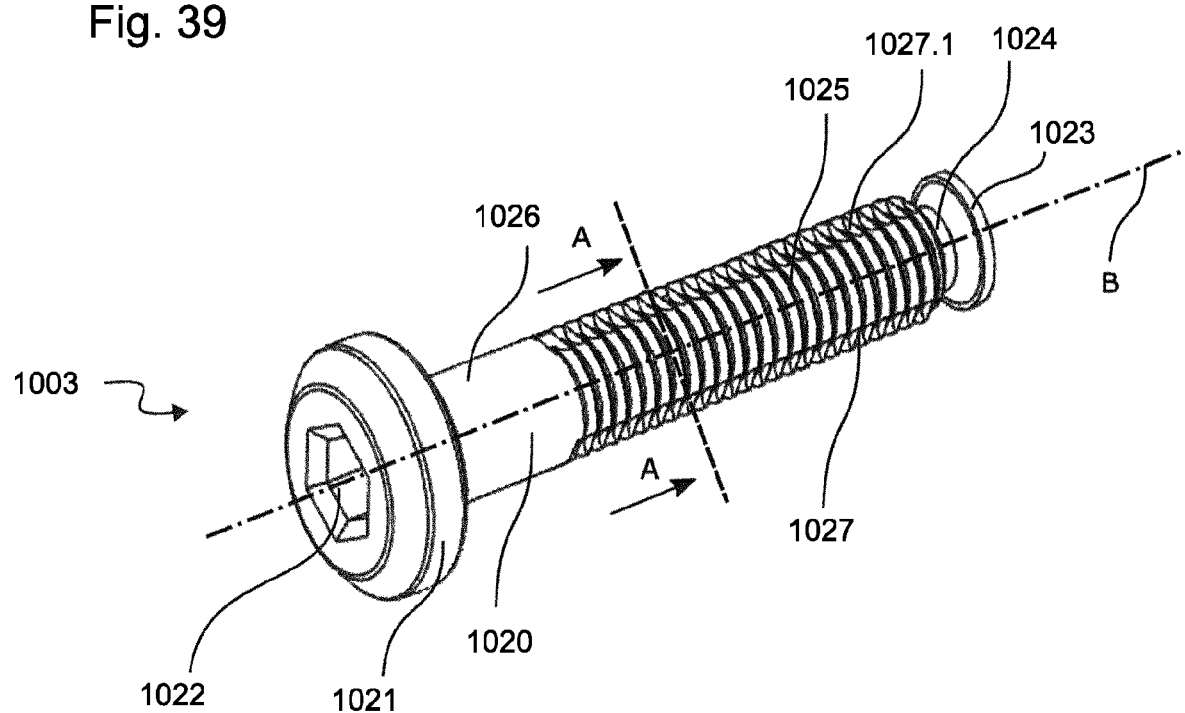
FIG. 39 shows the bolt of the adjustment arrangement of FIG. 34 in a perspective detailed side view.

In addition, the adjustment arrangement 1000 comprises the bolt 1003 shown in detail in FIG. 39. The bolt 1003 comprises a bolt axis B, which is designed as a symmetry axis in the present case. An interface 1022 for actuating the adjustment arrangement, preferably an interface for a tool, in particular a hexagon, is formed in the bolt head 1021, which is provided at one end of the bolt. A lateral portion 1020 connects to the bolt head 1021 in the direction of the bolt axis B. At first, the lateral portion 1020 exhibits a portion 1026 without external thread adjacent the bolt head 1021. This portion 1026 can be approximately 20% of the total length of the lateral portion 1020. A thread portion 1025 with an external thread formed on the lateral portion may adjoin the portion 1026. The thread portion 1025 may be approximately 65% of the total length of the lateral portion 1020. A groove 1024 may adjoin the thread portion 1025, which in turn may abut against an end element 1023. The end element 1023, which may be provided at the end of the bolt 1003 facing away from bolt head 1021, may have the same outer diameter as the portion without thread 1026. In addition, the thread portion 1025 may have the same outer diameter as the portions 1023 and 1026. It is conceivable that the end element 1023 is formed detachably at the bolt 1003 in order to enable the end element 1023 to be removed for allowing the barrel nut 1002 to be screwed onto the bolt 1003. Subsequently, the end element 1023 may be screwed onto the bolt 1003 to prevent the bolt 1003 from being completely unscrewed from the barrel nut 1002, for example.

Figure 40:
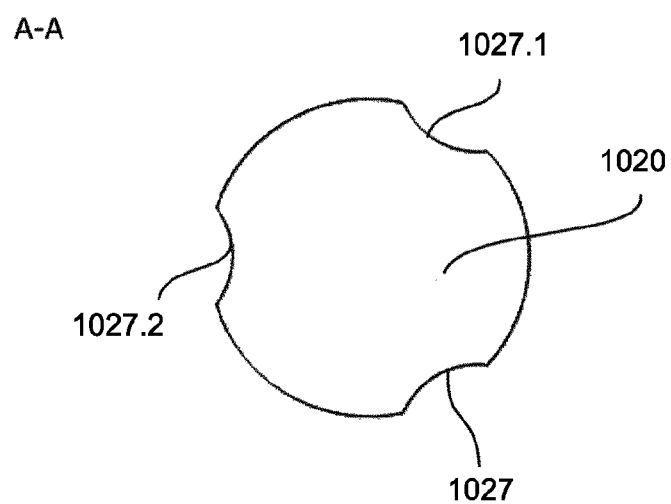
FIG. 40 shows a cross-sectional view of the bolt of FIG. 39 along line A-A.

In addition, the bolt 1003 of the present embodiment comprises three grooves 1027, 1027.1 and 1027.2, which extend parallel to the bolt axis B along the entire thread portion 1025. The three grooves 1027, 1027.1 and 1027.2 are shown in the sectional view of FIG. 40. As shown in FIG. 40, the grooves 1027, 1027.1 and 1027.2 are formed on the lateral face 1020 of the bolt 1003.

The adjustment arrangement 1000 of the roof rack foot 2000 of the present embodiment is configured such that the ball 1012 of the barrel nut 1002, which is biased via the spring 1013 towards the threaded through hole 1007, can penetrate into the grooves 1027, 1027.1 and 1027.2 in order to form a form-fit therewith. If the adjustment arrangement 1000 is to be adjusted to increase or decrease a distance between the clamping elements 2001 and 2002, the bolt 1003 must be turned against the spring force of the spring 1013 to push the ball 1012 out of the groove 1027, 1027.1 or 1027.2. The form-fit between the ball 1012 and the groove 1027, 1027.1 or 1027.2 thus provides a locking mechanism, which can prevent a screw connection between the bolt 1003 and the barrel nut 1002 from loosening even if the roof rack foot 2000 is exposed to strong vibrations.

For manufacturing the barrel nut 1002, firstly, a bore for the threaded through hole 1007 is formed in the barrel nut 1002. Subsequently, the internal thread 1008 is cut into the through hole 1007. In a next step, the bore 1010 is formed from the side face 1005 in the barrel nut 1002, wherein the narrowing portion 1011 is formed by means of a conical drilling and/or milling tool. In a subsequent step, the ball 1012 and the spring 1013 are placed in the bore 1010 before the bore 1010 is reduced in diameter at the side face 1005 by clinching to form a clinching portion 1014 as a support face for the spring 1013 and to prevent the spring 1013 and ball 1012 from escaping from the bore 1010. For manufacturing of the bolt 1003, at first, the grooves 1027, 1027.1 and 1027.2 are pressed into the lateral face of the lateral portion 1020. Subsequently, the external thread 1025 is cut into the lateral face, in which the grooves 1027, 1027.1 and 1027.2 are formed.

The adjustment mechanism 1000 described in connection with FIGS. 33 to 40 may also be used with any of the embodiments described in connection with FIGS. 1 to 32. For example, the tightening mechanism 500 may be formed like the adjustment mechanism 1000, wherein the tightening member 8 may be formed like the bolt 1003 and the pin 515 like the barrel nut 1002.

The present invention may also be defined by the following numbered clauses:

Clause 1: Roof rack foot (2000) with an adjustment arrangement (1000), which is preferably part of a clamping arrangement (2001, 2002) for clamping the roof rack foot (2000) to a vehicle roof, wherein the adjustment arrangement (1000) comprises: a bolt (1003) with an external thread (1025); a barrel nut (1002), preferably a cylindrical nut, with a barrel axis (F), which comprises a threaded through hole (1007), which is angled with respect to the barrel axis (F), preferably oriented perpendicular to the barrel axis (F), wherein the barrel nut (1002) is configured to be screwed onto the external thread (1025) of the bolt (1003) via the threaded through hole (1007); and a locking mechanism (1010, 1012, 1013, 1027) for preventing loosening of a screw connection between the bolt (1003) and the barrel nut (1002).

Clause 2: Roof rack foot (2000) according to clause 1, wherein the locking mechanism comprises a bore (1010) in the barrel nut (1002), which extends into the threaded through hole (1007), said bore (1010) preferably extending along the barrel axis (F), in which a locking element (1012) for preventing loosening of the screw connection is movably provided, said locking element (1012) preferably being biased with a spring element (1013) towards the threaded through hole (1007).

Clause 3: Roof rack foot (2000) according to clause 2, wherein the bore (1010) at the end facing away from the threaded through hole (1007) has been narrowed by clinching for preventing escape of the locking element (1012) and/or the spring (1013) from the bore (1010).

Clause 4: Roof rack foot (2000) according to clause 2 or 3, wherein the locking element is formed as a ball (1012) and the bore (1010) comprises a tapered portion (1011) adjacent the threaded through hole (1007) for preventing escape of the ball (1012) from the bore (1010).

Clause 5: Roof rack foot (2000) according to any one of clauses 2 to 4, the locking mechanism comprising a depression (1027) formed in the bolt (1003) and being configured to prevent loosening of the screw connection by an engagement of the locking element (1012) with the depression (1027).

Clause 6: Roof rack foot (2000) according to clause 5, wherein the depression (1027) in the bolt (1003) is formed as a groove (1027), preferably extending along the bolt axis (B), wherein the bolt (1003) preferably comprises two or three grooves (1027, 1027.1, 1027.2), which are preferably equidistantly spaced in the circumferential direction.

Clause 7: Roof rack with a roof rack foot (2000) according to any one of clauses 1-6.

Clause 8: Method of manufacturing a bolt (1003) comprising an external thread (1025), said bolt (1003) preferably being suitable to be used with an adjustment arrangement (1000) of a roof rack foot (2000) according to any one of clause 1 to 6, comprising pressing a groove (1027), which preferably extends in the direction of the bolt axis (B), in the lateral face of the bolt (1003), wherein preferably two or three grooves (1027, 1027.1, 1027.2), which are preferably equidistantly spaced in the circumferential direction, are pressed in the lateral face; and preferably subsequently, cutting an external thread (1025) in the lateral face of the bolt (1003).

Clause 9: Method of manufacturing a barrel nut (1002), said barrel nut (1002) preferably being suitable to be used with an adjustment arrangement (1000) of a roof rack foot (2000) according to any one of clauses 1 to 6, comprising forming a bore (1010) in the barrel nut (1002); positioning of a locking element (1012), preferably a ball (1012) and/or a spring (1013) for biasing the ball (1012), in the bore (1010) for preventing loosening of a screw connection between the barrel nut (1002) and a threaded bolt (1003); and preferably subsequently, narrowing the diameter of the bore (1010) at one end by means of clinching for preventing escape of the locking element (1012) from the bore (1010).

The invention claimed is:

1. A load carrier foot for supporting a load bar on a vehicle, said load carrier foot comprising:
 a holder adapted to receive a load carrier bracket for coupling said load carrier foot to said vehicle,
 wherein said holder comprises a sleeve portion defining an accommodating space which is configured to at least partially accommodate said load carrier bracket,
 wherein said sleeve portion comprises an overlap section at which a first joining section and a second joining section are overlapped and
 wherein said sleeve portion is formed by bending a metal sheet.

2. The load carrier foot according to claim 1, wherein said joining sections are joined by material forming at least two joining portions.

3. The load carrier foot according to claim 1, wherein said sleeve portion has an upper edge portion at least partially defining an upper opening of said sleeve portion, wherein said upper edge portion is configured for an engagement with said load carrier bracket.

4. The load carrier foot according to claim 3, wherein said upper edge portion is convexly formed.

5. The load carrier foot according to claim 3, further comprising an urging member configured to apply a pushing force on a holder engaging section of said load carrier bracket towards said upper edge portion.

6. The load carrier foot according to claim 1, wherein said holder comprises a lower edge portion at least partially defining a lower opening of said sleeve portion, wherein said lower edge portion is configured to contact said load carrier bracket and to transfer a pushing force on said load carrier bracket.

7. The load carrier foot according to claim 1, wherein said overlap section is quadrangular.

8. A load carrier, comprising:
a load carrier foot comprising a holder adapted to receive a load carrier bracket for coupling said load carrier foot to a vehicle,
wherein said holder comprises a sleeve portion defining an accommodating space which is configured to at least partially accommodate said load carrier bracket,
wherein said sleeve portion comprises an overlap section at which a first joining section and a second joining section are overlapped,
wherein said sleeve portion is formed by bending a metal sheet, and
wherein said load carrier bracket comprises a vehicle engaging section and a trough-shaped coupling portion, said trough-shaped coupling portion extending from said vehicle engaging section in a longitudinal direction of the load carrier bracket and comprising a holder engaging section engageable with said holder of said load carrier foot.

9. The load carrier according to claim 8, wherein said trough-shaped coupling portion is funnel-shaped with said holder engaging section being formed at a narrow end or wherein said trough-shaped coupling portion is continuously convexly formed in its longitudinal direction and comprises an outer surface adapted to receive a force from said holder of said load carrier foot.

10. The load carrier according to claim 8, wherein said trough-shaped coupling portion extends over the entire length of the load carrier bracket or at least partially comprises a box-like shape having two side walls and a bottom wall which is arranged substantially perpendicular to said side walls.

11. The load carrier according to claim 8, wherein a free end of said vehicle engaging section protrudes from said load carrier bracket on one side in a direction which is angled with respect to or is perpendicular to a longitudinal extension direction of said trough-shaped coupling portion and wherein said trough-shaped coupling portion provides a bulging which is provided on a side of said load carrier bracket opposite to the side where said free end of the vehicle engaging section protrudes from said load carrier bracket, or wherein said trough-shaped coupling portion provides said bulging in only one direction.

12. The load carrier according to claim 8, wherein said holder engaging section is configured such that said load carrier bracket can be hooked on said holder.

13. The load carrier according to claim 12, wherein said holder engaging section comprises two hooks, and wherein said hooks and a free end of said vehicle engaging section protrude from a same side of said load carrier bracket or wherein said hooks are configured such that they can be engaged with an upper edge portion of said sleeve portion.

14. The load carrier according to claim 8, wherein said load carrier bracket is partially accommodated in said accommodating space and releasably engaged with said holder.

15. The load carrier according to claim 14, wherein said load carrier foot further comprises a tightening member having a tightening member operating portion arranged in said accommodating space between an inner wall of said holder and said load carrier bracket.

16. The load carrier according to claim 15, wherein said holder and said load carrier bracket comprise access openings configured to provide tool access to said tightening member operating portion.

17. A load carrier foot for supporting a load bar on a vehicle, said load carrier foot comprising:
a holder adapted to receive a load carrier bracket for coupling said load carrier foot to said vehicle,
wherein said holder comprises a sleeve portion defining an accommodating space which is configured to at least partially accommodate said load carrier bracket,
wherein said sleeve portion is formed such that said accommodating space is tapered in a longitudinal direction towards an upper portion of said holder,
wherein said sleeve portion further comprises an inner wall and two side walls, wherein at least said side walls are inclined with respect to the longitudinal direction in order to form said tapered accommodating space,
wherein said sleeve portion comprises an overlap section at which a first joining section and a second joining section are overlapped, and
wherein said overlap section defines an outer wall of said sleeve portion.

* * * * *